US011703562B2

(12) United States Patent
Laddha et al.

(10) Patent No.: US 11,703,562 B2
(45) Date of Patent: Jul. 18, 2023

(54) SEMANTIC SEGMENTATION OF RADAR DATA

(71) Applicant: UATC, LLC, San Francisco, CA (US)

(72) Inventors: Ankit Laddha, Pittsburgh, PA (US); Carlos Vallespi-Gonzalez, Wexford, PA (US); Duncan Blake Barber, Pittsburgh, PA (US); Jacob White, Glenshaw, PA (US); Anurag Kumar, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 603 days.

(21) Appl. No.: 16/575,855

(22) Filed: Sep. 19, 2019

(65) Prior Publication Data

US 2021/0003665 A1      Jan. 7, 2021

Related U.S. Application Data

(60) Provisional application No. 62/870,998, filed on Jul. 5, 2019.

(51) Int. Cl.
| | |
|---|---|
| *G01S 13/86* | (2006.01) |
| *G01S 7/28* | (2006.01) |
| *G01S 13/931* | (2020.01) |
| *G01S 13/90* | (2006.01) |

(52) U.S. Cl.
CPC .......... *G01S 7/2813* (2013.01); *G01S 13/865* (2013.01); *G01S 13/9011* (2013.01); *G01S 13/9017* (2013.01); *G01S 13/931* (2013.01)

(58) Field of Classification Search
CPC .............. G01S 13/865; G01S 13/9011; G01S 13/9017; G01S 13/931; G01S 17/42; G01S 17/931; G01S 7/2813; G01S 7/417; G01S 7/4808
See application file for complete search history.

(56) References Cited

U.S. PATENT DOCUMENTS

| | | | | |
|---|---|---|---|---|
| 3,952,304 | A * | 4/1976 | Broniwitz | G01S 13/4472 342/107 |
| 9,632,502 | B1 * | 4/2017 | Levinson | G06N 20/00 |
| 9,916,703 | B2 * | 3/2018 | Levinson | G07C 5/0866 |
| 2018/0156913 | A1 * | 6/2018 | Baba | G01S 13/867 |
| 2018/0349746 | A1 * | 12/2018 | Vallespi-Gonzalez | G01S 17/89 |

(Continued)

*Primary Examiner* — Timothy A Brainard
(74) *Attorney, Agent, or Firm* — Dority & Manning, P.A.

(57) ABSTRACT

Systems, methods, tangible non-transitory computer-readable media, and devices associated with sensor output segmentation are provided. For example, sensor data can be accessed. The sensor data can include sensor data returns representative of an environment detected by a sensor across the sensor's field of view. Each sensor data return can be associated with a respective bin of a plurality of bins corresponding to the field of view of the sensor. Each bin can correspond to a different portion of the sensor's field of view. Channels can be generated for each of the plurality of bins and can include data indicative of a range and an azimuth associated with a sensor data return associated with each bin. Furthermore, a semantic segment of a portion of the sensor data can be generated by inputting the channels for each bin into a machine-learned segmentation model trained to generate an output including the semantic segment.

20 Claims, 11 Drawing Sheets

(56) References Cited

U.S. PATENT DOCUMENTS

| | | | |
|---|---|---|---|
| 2019/0135300 A1* | 5/2019 | Gonzalez Aguirre | ....................... G05D 1/0088 |
| 2019/0144255 A1* | 5/2019 | Dresser | ................ B67D 1/0881 141/94 |
| 2019/0147610 A1* | 5/2019 | Frossard | ................. G06T 7/248 382/103 |
| 2020/0160104 A1* | 5/2020 | Urtasun | ................ G06N 3/084 |
| 2020/0160117 A1* | 5/2020 | Urtasun | ................ G06V 10/82 |
| 2020/0160151 A1* | 5/2020 | Urtasun | ........... G06V 30/19127 |

* cited by examiner

FOREGROUND-BACKGROUND SEGMENTATION SYSTEM 1100

ONE OR MORE DATA ACCESSING UNITS 1102

ONE OR MORE SENSOR DATA ASSOCIATION UNITS 1104

ONE OR MORE CHANNEL GENERATION UNITS 1106

ONE OR MORE SEMANTIC SEGMENTATION UNITS 1108

ONE OR MORE OUTPUT GENERATION UNITS 1110

ONE OR MORE LOSS DETERMINATION UNITS 1112

ONE OR MORE PARAMETER ADJUSTMENT UNITS 1114

ONE OR MORE DEVICE CONTROL UNITS 1116

FIG. 11

SEMANTIC SEGMENTATION OF RADAR DATA

RELATED APPLICATION

The present application is based on and claims benefit of U.S. Provisional Patent Application No. 62/870,998 having a filing date of Jul. 5, 2019, which is incorporated by reference herein.

FIELD

The present disclosure relates generally to semantic segmentation using a machine-learning model to segment representations of an environment.

BACKGROUND

Vehicles, including autonomous vehicles, can receive data that is used to determine the state of an environment through which the vehicle travels. This data can include various representations of the environment such as images. As the state of objects in the environment is dynamic, and the set of objects in the environment can change over time, operation of a vehicle may rely on an accurate determination of the state of the representation of the environment over time.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of semantic segmentation. The computer-implemented method can include accessing, by a computing system including one or more computing devices, sensor data including a plurality of sensor data returns representative of an environment detected by at least one sensor across a field of view of the at least one sensor. The computer-implemented method can include associating, by the computing system, each sensor data return of the plurality of sensor data returns with a respective bin of a plurality of bins corresponding to the field of view of the at least one sensor. Each bin can correspond to a different portion of the field of view of the at least one sensor. The computer-implemented method can include generating, by the computing system, a plurality of channels for each bin of the plurality of bins. The plurality of channels for each bin can include data indicative of a range and an azimuth associated with at least one sensor data return associated with such bin. Furthermore, the computer-implemented method can include generating, by the computing system, a semantic segment of at least a portion of the sensor data representative of the environment by inputting the plurality of channels for each bin into a machine-learned segmentation model trained to segment at least a portion of the plurality of sensor data returns based at least in part on input including the plurality of channels for each bin of the plurality of bins. The machine-learned segmentation model can generate at least one output including the semantic segment.

Another example aspect of the present disclosure is directed to a computing system including: one or more processors; a memory including one or more computer-readable media, the memory storing computer-readable instructions that when executed by the one or more processors cause the one or more processors to perform operations. The operations can include accessing sensor data associated with radar output of at least one radar device that detects one or more distances and angles of one or more objects relative to the at least one radar device across a field of view of the at least one radar device. The operations can include respectively associating a plurality of radar points from the sensor data with a plurality of portions of the field of view of the at least one radar device. The operations can include generating a plurality of channels for each portion of the field of view of the at least one radar device. The plurality of channels can include data indicative of one or more features of at least one radar point associated such portion of the field of view. The operations can include determining one or more foreground segments of the sensor data based at least in part on the plurality of channels and a machine-learned segmentation model trained to segment the plurality of radar points based at least in part on input including the plurality of channels for each portion of the field of view. Furthermore, the operations can include generating sensor detection output including information associated with the one or more foreground segments.

Another example aspect of the present disclosure is directed to autonomous vehicle including: one or more processors; a memory including one or more computer-readable media, the memory storing computer-readable instructions that when executed by the one or more processors cause the one or more processors to perform operations. The operations can include accessing sensor data including a plurality of sensor data returns representative of an environment detected by at least one sensor across a field of view of the at least one sensor. The operations can include associating each sensor data return of the plurality of sensor data returns with a respective bin of a plurality of bins corresponding to the field of view of the at least one sensor. Each bin can correspond to a different portion of the field of view of the at least one sensor. The operations can include generating a plurality of channels for each bin of the plurality of bins. The plurality of channels for each bin can include data indicative of a range and an azimuth associated with at least one sensor data return associated with such bin. The operations can include generating a semantic segment of at least a portion of the sensor data representative of the environment by inputting the plurality of channels for each bin into a machine-learned segmentation model trained to segment at least a portion of the plurality of sensor data returns based at least in part on input including the plurality of channels for each bin of the plurality of bins. The machine-learned segmentation model can generate at least one output including the semantic segment.

Other example aspects of the present disclosure are directed to other systems, methods, vehicles, apparatuses, tangible non-transitory computer-readable media, and devices for semantic segmentation.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 11 depicts a diagram of an example system according to example embodiments of the present disclosure.

DETAILED DESCRIPTION

Figure 1:
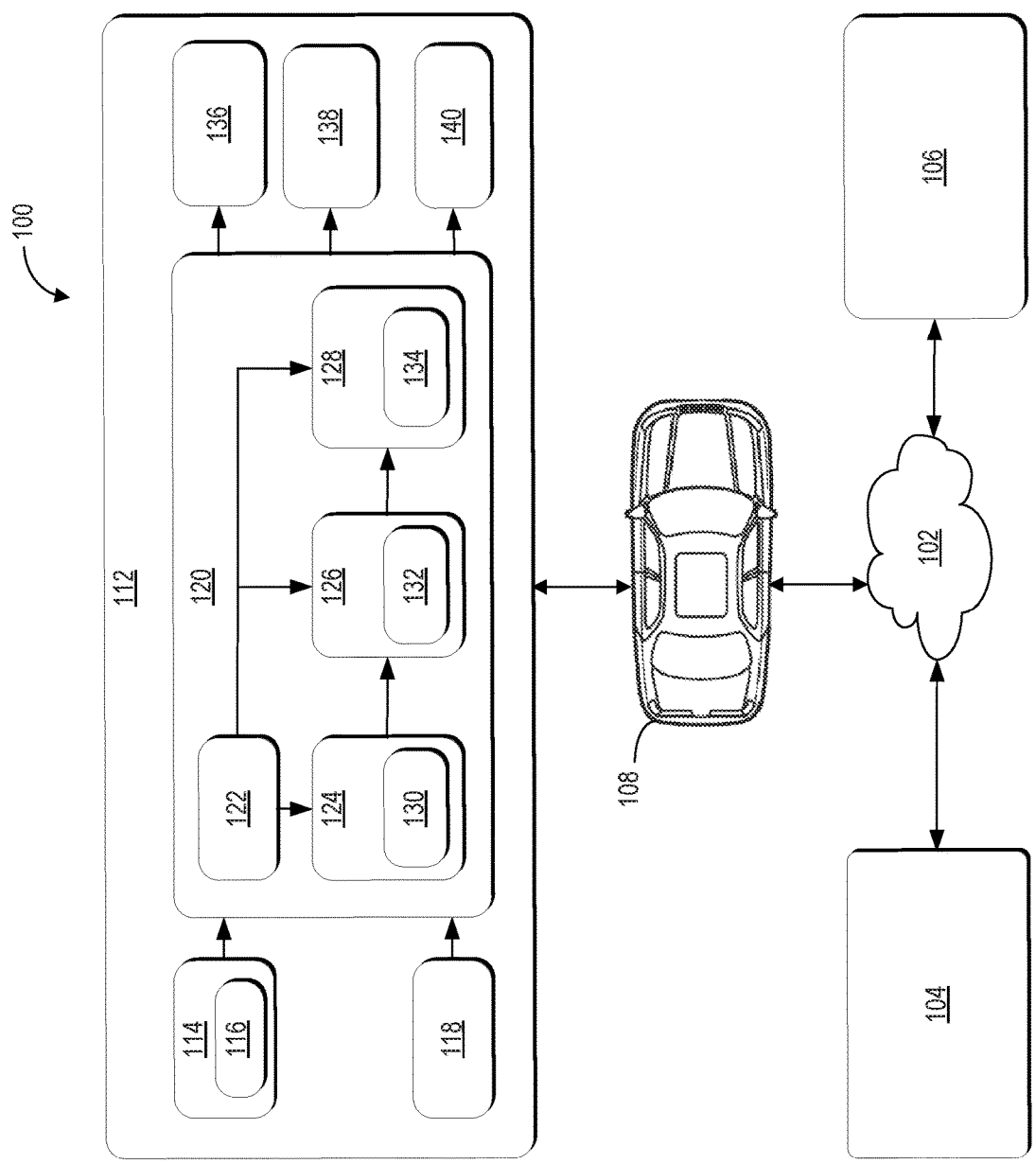
FIG. 1 depicts a diagram of an example system according to example embodiments of the present disclosure.

Example aspects of the present disclosure are directed to semantic segmentation based on sensor data and the use of machine-learned models that have been trained to segment foreground and background portions of an environment represented by the sensor data. The semantic segmentation described in the present disclosure can be used to generate more accurate sensor outputs that can be used to improve the performance of various systems including the perception and/or tracking systems used in autonomous vehicles.

More particularly, aspects of the present disclosure can include a computing system that is configured to use a machine-learned model to generate semantic segments that represent objects detected in an environment. Further, the semantic segments can be associated with foreground and background portions of the environment that a perception and/or tracking system can use to better determine the state of the environment. For example, the computing system can use sensor data associated with the state of the environment as an input to a machine-learned semantic segmentation model that has been trained to generate output including the semantic segments.

In particular, the sensor data can be based on sensor data returns from a sensor including a radar device or light detection and ranging (LiDAR) device that provide information that can be used to generate a three-dimensional representation of the environment. Further, the computing system can associate the sensor data returns with corresponding bins based on the field of view of the sensor. For example, an array of four sensors that detect a three-hundred and sixty degree field of view can generate sensor data returns that are associated with three-hundred and sixty bins each of which include the sensor data returns from one degree of the field of view. Each of the bins can be used to generate channels that are associated with various aspects of the sensor data returns for the objects detected by the sensor device. For example, the channels can include a range, an azimuth, and a signal to noise ratio information associated with the sensor data returns in each of the bins. The channels can be used to generate a feature vector that includes information associated with the features of the channels which can then be provided as input to a machine-learned segmentation model. The computing system can provide the feature vector as input to the machine-learned segmentation model which can then generate an output including the semantic segments that can be used to indicate the portions of the environment to classify as foreground or background. The foreground can include portions of the environment detected by the sensor that are useful and/or significant to a perception system of an autonomous device. For example, the foreground can include the portions of the environment that include solid objects that an autonomous vehicle should navigate around.

Accordingly, aspects of the present disclosure can be used to improve the performance and efficiency of a variety of tasks that use sensor data including determining the state of a dynamic environment by perception systems of autonomous devices including autonomous vehicles, robotic devices, and/or other devices that can benefit from more accurate segmentation of sensor data.

The computing system can access sensor data. Accessing the sensor data can include sending and/or receiving one or more signals, data, and/or information to or from one or more sensors. The sensor data can include a plurality of sensor data returns that are representative of an environment. In some embodiments, the sensor data can be generated by one or more sensors that can include at least one sensor that detects the environment across a field of view of the at least one sensor. The sensor data can be based at least in part on sensor data returns associated with one or more sensors including at least one radar device, at least one LiDAR device, and/or at least one sonar device. Further, the one or more sensor data returns can be based at least in part on the state of the environment detected by the one or more sensor devices.

For example, the computing system can access sensor data associated with radar output of at least one radar device that detects one or more distances and/or angles of one or more objects relative to the at least one radar device across a field of view of the at least one radar device. By way of further example, the computing system can access sensor data associated with LiDAR output of at least one LiDAR device that generates a LiDAR point cloud indicating the location of objects in the field of view of the LiDAR device (e.g., a three-hundred and sixty degree field of view). In some embodiments, the sensor data can be based at least in part on the sensor data returns from more than one sensor. For example, the sensor data returns from three sensors, each of which can detect different, overlapping, one-hundred and fifty degree fields of view, can be used to detect the environment in a three-hundred and sixty degree field of view.

Furthermore, each of the plurality of sensor data returns can be respectively associated with one or more detections by the at least one sensor in each of the different portions of the field of view. In some embodiments, the sensor data can include an estimate of whether portions of the environment are classified as foreground or background.

The field of view of the at least one sensor can include various horizontal, vertical, and/or other fields of view within which the at least one sensor detects the environment external to the at least one sensor. Further, the field of view can be divided into one or more portions. The one or more portions of the field of view can be different sizes or the same size. For example, the entire field of view can be three-hundred and sixty degrees and can be divided into three-hundred and sixty one-degree portions of equal size, each of which can be associated with a subset of the plurality of sensor data returns. In some embodiments, the field of view can include a three-hundred and sixty degree field of view around the at least one sensor and/or a device associated with the sensor (e.g., an autonomous vehicle).

In some embodiments, the plurality of sensor data returns can include a plurality of two-dimensional sensor data returns. For example, the two-dimensional sensor data returns can include ranges and azimuths associated with each sensor data return. Further, the computing system can rasterize at least a portion of the plurality of two-dimensional sensor data returns into a single dimension. For example, rasterizing the two-dimensional sensor data can include generating a plurality of one-dimensional sensor data returns, each of which is associated with a single fixed azimuth and a variable range.

In some embodiments, the computing system can select, for each bin of the plurality of bins, a two-dimensional sensor data return having a minimum distance relative to the at least one sensor. For example, in a bin with three sensor data returns indicating objects at two-hundred meters, one-hundred meters, fifty meters, and thirty meters, the computing system will select the sensor data return indicating the object at thirty meters.

In some embodiments, rasterizing at least a portion of the plurality of two-dimensional sensor data returns into a single dimension can include discarding the two-dimensional sensor data returns that were not selected from the plurality of bins and generating a rasterized data output indicative of a plurality of selected two-dimensional sensor data returns from the plurality of bins. In this way, the computing system can reduce memory usage by not storing the sensor data returns that will not be used.

In some embodiments, the at least one sensor can include one or more light detection and ranging (LiDAR) devices. Further, the plurality of channels for each bin associated with the sensor data returns of the one or more LiDAR devices can include data indicative of an intensity associated with a return strength of each of a plurality of pulses generated by each of the one or more LiDAR devices.

In some embodiments, the at least one sensor can include a plurality of sensors that detect different subsets of the field of view. For example, four sensors detect an aggregate three-hundred and sixty degree field of view can detect four overlapping fields of view of one-hundred and twenty degrees, sixty degrees, one-hundred degrees, and ninety degrees respectively. In some embodiments, the different portions of the field of view detected by the plurality of sensors can overlap.

In some embodiments, the field of view of the at least one sensor can include a plurality of different portions. For example, the at least one sensor can include a field of view that has two portions covering different sixty degree fields of view each.

In some embodiments, the computing system can use map data as part of the semantic segmentation. The computing system can access map data that can include information associated with one or more portions of the environment that are classified as foreground or background. For example, the map data can classify the road within thirty meters of the at least one sensor as foreground and the middle of a farm field one hundred meters away from the at least one sensor as background.

In some embodiments, the computing system can determine that the plurality of sensor data returns are associated with the one or more portions of the environment that are classified as foreground. For example, the computing system can use the map data to determine that the plurality of sensor data returns are associated with the one or more portions of the environment including a road classified as foreground.

The computing system can associate each sensor data return with a respective bin of plurality of bins associating each sensor data return of the plurality of sensor data returns with a respective bin of a plurality of bins corresponding to the field of view of the at least one sensor. Each bin can correspond to a different portion of the field of view of the at least one sensor.

In some embodiments, the plurality of sensor data returns can include a plurality of radar points from the sensor data. Further, the plurality of portions of the field of view can be associated with at least one radar device.

In some embodiments, the at least one sensor data return associated with each bin can include a single sensor data return including the two-dimensional sensor data return having the minimum distance relative to the at least one sensor.

The computing system can generate a plurality of channels for each bin of the plurality of bins. The plurality of channels for each bin can include data indicative of a range and an azimuth associated with at least one sensor data return associated with such bin. Further, the plurality of channels for each bin can include an ego-motion compensated velocity, a signal to noise ratio, and/or an indication of whether an object was detected.

Further, the plurality of channels for each bin of the plurality of bins can include and/or be associated with a feature vector. The feature vector for each bin can include a plurality of features each of which can correspond to one of the plurality of channels.

In some embodiments, the plurality of channels for each bin can correspond to the sensor data return that is closest to the at least one sensor and can be associated with such bin.

The computing system can generate data and/or information including a semantic segment of at least a portion of the sensor data representative of the environment. The computing system can generate the semantic segment by inputting the plurality of channels for each bin into a machine-learned model which can include a machine-learned segmentation model. The machine-learned segmentation model can include a convolutional neural network, a recurrent neural network, a recursive neural network, a decision tree, logistic regression model, and/or a support vector machine.

The machine-learned segmentation model can be configured and/or trained to segment at least a portion of the plurality of sensor data returns based at least in part on input including the plurality of channels for each bin of the plurality of bins. Further, the machine-learned segmentation model can be configured and/or trained to generate at least one output including the semantic segment. In some embodiments, the at least one output can include one or more semantic segments, each of which can be associated with a foreground or background segment.

The computing system can generate one or more outputs which can include one or more sensor detection outputs. The sensor detection outputs can include data and/or information associated with one or more semantic segments including the semantic segment. Further, the semantic segment can include one or more foreground segments and/or one or more background segments.

In some embodiments, the computing system can train the machine-learned segmentation model. The machine-learned segmentation model can be iteratively trained. For example, the machine-learned segmentation model can be trained over the course of several iterations, in which the parameters of the machine-learned segmentation model are adjusted after each of the iterations based at least in part on evaluation of a loss function.

Training the machine-learned segmentation model can include the computing system accessing training data that can include a plurality of training feature vectors respectively associated with a plurality of training representations and one or more features of each of the plurality of training representations. For example, the training data can include training representations that include portions of the plurality of training representations that are labelled as foreground or background.

Further, the computing system can determine one or more training foreground segments of the plurality of training representations based at least in part on the plurality of training feature vectors and the machine-learned segmentation model. For example, the machine-learned segmentation model can include a convolutional neural network that includes a plurality of layers. The first layer of the convolutional neural network can receive the plurality of training vectors and generate a feature map that is provided as input to the next layer which can generate its own feature map. Subsequent layers in the convolutional neural network can generate their own feature maps based on the input provided by the preceding layers. The final layer in the convolutional neural network can generate output which can include the one or more foreground training segments.

The computing system can determine a loss based at least in part on one or more comparisons of the one or more training foreground segments of the plurality of training representations to one or more ground-truth foreground segments. For example, the loss can be based at least in part on the evaluation of a loss function associated with the proportion of the one or more training foreground segments that were correctly determined by the machine-learned segmentation model relative to ground-truth foreground segments.

In some embodiments, the loss can be determined based at least in part on an accuracy of the one or more training foreground segments of the plurality of training representations. The accuracy can be positively correlated with a proportion of the one or more training foreground segments that correspond to the one or more ground-truth foreground segments. Further, the loss can be inversely correlated with the accuracy.

The computing system can then adjust one or more parameters of the machine-learned segmentation model based at least in part on the loss. For example, the machine-learned segmentation model can adjust the one or more parameters based at least in part on the contributions that each of the one or more parameters make towards minimizing the loss (e.g., more accurately determining the portions of the training representations that are foreground and background). Furthermore, the one or more parameters of the machine-learned segmentation model can be weighted in proportion to their contribution to decreasing the loss so that parameters that contribute more to reducing the loss are weighted more heavily.

The computing system can send at least one output to a perception system of an autonomous vehicle. The outputs can include the one or more sensor detection outputs. The perception system can be configured to use the at least one output to determine one or more locations of one or more objects in the environment. For example, the one or more sensor detection outputs can include radar points that have been semantically segmented into foreground and background portions which can be provided to a perception system that will analyze the semantic segment (e.g., the foreground) as well as the radar points.

The computing system can control various systems which can include one or more autonomous vehicle systems of the autonomous vehicle. The computing system can control the autonomous vehicle systems based at least in part on the at least one output. The autonomous vehicle systems can include one or more engine systems, one or more motor systems, one or more steering systems, one or more braking systems, one or more electrical systems, and/or one or more communications systems.

A computing system according to the disclosed technology can include one or more computing devices configured to perform various operations including one or more operations using sensor data and machine-learned models to determine semantic segments associated with an environment represented by the sensor data. Further, the computing system can include one or more computing devices associated with one or more processors and one or more memory storage devices. The operations performed by the computing system can include controlling a variety of systems and/or components including: autonomous devices which can include autonomous vehicles; machine-learning systems; and/or robotic systems.

The computing system can process, generate, access, send, and/or receive, one or more signals, information, and/or data which can include signals, information, and/or data exchanged with various locally accessible computing systems and/or remote computing systems. Furthermore, the computing systems and/or computing devices described herein can access information and/or data by obtaining and/or retrieving the data and/or information (e.g., actively accessing data) from another computing system and/or computing device; and/or receiving, being sent, and/or being provided with data and/or information (e.g., passively accessing data) from another computing system and/or computing device.

In some embodiments, the computing system can control and/or perform operations associated with an autonomous vehicle and/or a computing system associated with an autonomous vehicle. The computing system can for example, send and/or receive data associated with one or more perception systems, one or more autonomy systems, one or more prediction systems, and/or one or more motion planning systems of an autonomous vehicle.

The systems, methods, devices, and non-transitory computer-readable media in the disclosed technology can provide a variety of technical effects and benefits including improving the effectiveness of sensor output segmentation in general and improving the overall operation of a vehicle that uses segmentation information for navigation in particular. By more effectively segmenting the foreground and background of an environment through use of one or more machine-learned models, the disclosed technology can provide various benefits including more efficient segmentation, improved scalability, reduced wear and tear on a vehicle, greater fuel efficiency, improved safety, and an overall improvement in the utilization of computational resources that results from a more efficient segmentation.

The disclosed technology can achieve more efficient segmentation by leveraging the use of one or more machine-learned models including a machine-learned segmentation model. The one or more machine-learned models can be trained to more efficiently segment foreground and background portions of the representation of an environment depicted in sensor data by binning sensor data returns and focusing on the sensor data returns that are closest to the sensor.

Furthermore, by using the one or more machine-learned models, the disclosed technology has the additional advantage of improved scalability. In particular, a machine-learned segmentation model that can be retrained using additional sets of training data can be continuously improved without the burdensome manual derivations and adjustments that are often required in rules-based models or heuristic models that do not use machine-learning. For example, in a manually derived rules based model, a human designer would need to manually derive heuristic models that determine the various portions of an environment that are associated with foreground and background including manually weighting parameters associated with channels of sensor data that are associated with various features detected by the associated sensor. As such, the task of crafting and adjusting a heuristic model is onerous relative to using a machine-learned segmentation model that is trained using training datasets. Further, the one or more machine-learned models in the disclosed technology can be trained using relevant training data including sensor data from a variety of sensors including radar devices and LiDAR devices. Additionally, the one or more machine-learned models can readily revised as new training data becomes available or new uses for the one or more machine-learned models are envisioned.

The disclosed technology can also improve the operation of a vehicle by reducing the amount of wear and tear on vehicle components through more gradual adjustments in the vehicle's travel path that can be performed based on the more accurate segmentation of representations of an environment included in sensor data. For example, more accurate segmentation can result in better performance by perception systems of an autonomous vehicle which can in turn result in a more safe and smooth ride with fewer sudden stops and course corrections that impose strain on a vehicle's engine, braking, and steering systems. Additionally, fewer course corrections have the added benefit of reducing fuel consumption and improving the comfort of passengers when the vehicle is in transit due to smoother adjustments by the vehicle.

Additionally, more effective semantic segmentation can allow for an improvement in safety for passengers inside a vehicle as well as individuals outside the vehicle including pedestrians, cyclists, and/or passengers of other vehicles. For example, the more accurate segmentation of sensor data into foreground and background can be used by an autonomous vehicle's perception and motion planning systems to more effectively avoid unintentional contact with objects outside the vehicle.

The use of machine-learned models to determine foreground and background portions of an environment before passing the sensor data to a perception system can reduce the burden on the perception system and other autonomous vehicle systems that rely on sensor data. Less noisy sensor data can result in less usage of computational resources including memory resources, processor resources, and bandwidth used to transmit the sensor data between systems.

Accordingly, the disclosed technology provides a host of improvements to semantic sensor segmentation. Operational benefits of the disclosed technology include more efficient semantic segmentation, improved scalability, reduced wear and tear on a vehicle, greater energy efficiency, improved safety, and/or an overall improvement in the efficiency of utilizing computational resources.

With reference now to FIGS. 1-12, example embodiments of the present disclosure will be discussed in further detail. FIG. 1 depicts a diagram of an example system 100 according to example embodiments of the present disclosure. As illustrated, FIG. 1 shows a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more services to a plurality of users via a fleet of vehicles that can include, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform one or more operations and/or functions including any of the operations and/or functions of the one or more remote computing devices 106 and/or the vehicle computing system 112. Furthermore, the operations computing system 104 can perform one or more operations and/or functions including accessing sensor data including sensor data returns representative of an environment detected across the field of view of a sensor; associating each sensor data return with a bin of a plurality bins in which each bin corresponds to a portion of the sensor's field of view; generating a plurality of channels for each bin in which the channels include a range and/or azimuth; and generating semantic segments of the sensor data using the plurality of channels and a machine-learned segmentation model.

Furthermore, the one or more memory devices of the operations computing system 104 can store data including instructions used to implement one or more machine-learned models that have been configured and/or trained to generate an output based at least in part on an input provided to the one or more machine-learned models. For example, the one or more machine-learned models stored in the one or more memory devices of the operations computing system 104 can include one or more convolutional neural networks, one or more residual convolutional neural networks, one or more recurrent neural networks, and/or one or more recursive neural networks. Further, the one or more machine-learned models stored in the one or more memory devices of the operations computing system 104 can include one or more machine-learned segmentation models, which are described herein including in the methods 700-1000 that are depicted in FIGS. 7-10.

Furthermore, the operations computing system 104 can be configured to monitor and communicate with the vehicle 108 and/or its users to coordinate a vehicle service provided by the vehicle 108. To do so, the operations computing system 104 can manage a database that includes data including state data associated with the state of one or more objects including one or more objects external to the vehicle 108. The state data can include a location of an object (e.g., a latitude, longitude, and/or altitude of an object detected by the one or more sensors 114 of the vehicle 108), the state of a vehicle (e.g., the velocity, acceleration, heading, and/or location of the vehicle 108), and/or the state of objects external to a vehicle (e.g., the physical dimensions, velocity, acceleration, heading, shape, and/or appearance of objects external to the vehicle). In some embodiments, the state data can include one or more portions of the sensor data that is described herein including in the methods 700-1000 that are depicted in FIGS. 7-10.

The operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. Furthermore, the one or more memory devices of the one or more remote computing devices 106 can be used to store data including the sensor data, the training data, and/or the one or more machine-learned models that are stored in the operations computing system 104.

The one or more remote computing devices 106 can communicate (e.g., send and/or receive data and/or signals) with one or more devices including the operations computing system 104 and the vehicle 108 via the communications network 102. For example, the one or more remote computing devices 106 can request the location of the vehicle 108 or the state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. Further, the vehicle 108 can include a vehicle that can be towed and/or carried by another vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions including any of the one or more operations and/or functions performed by the operations computing system 104 and/or the one or more remote computing devices 106. Further, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including accessing sensor data including sensor data returns representative of an environment detected across the field of view of a sensor; associating each sensor data return with a bin of a plurality bins in which each bin corresponds to a portion of the sensor's field of view; generating a plurality of channels for each bin in which the channels include a range and/or azimuth; and generating semantic segments of the sensor data using the plurality of channels and a machine-learned segmentation model. Furthermore, the one or more memory devices of the vehicle computing system 112 can be used to store data including the sensor data, the training data, and/or the one or more machine-learned models that are stored in the operations computing system 104.

Furthermore, the vehicle computing system 112 can perform one or more operations associated with the control, exchange of data, and/or operation of various devices and systems including robotic devices, augmented reality devices, and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, cyclists, vehicles, bicycles, buildings, roads, sidewalks, trees, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, the sensor data 116 can be indicative of radar points associated with one or more objects in an environment detected by the one or more sensors 114 including one or more radar devices. By way of further example, the sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class, vehicle class, or bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 relative to one or more objects detected by the one or more sensors 114 including one or more radar devices. By way of further example, the autonomy computing system 120 can provide one or more outputs including a graphical display of the location of the vehicle 108 on a map of a geographical area within one kilometer of the vehicle 108, including the locations of objects around the vehicle 108. A passenger of the vehicle 108 can interact with the one or more human-machine interfaces 140 by touching a touchscreen display device associated with the one or more human-machine interfaces to indicate, for example, a stopping location for the vehicle 108.

In some embodiments, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
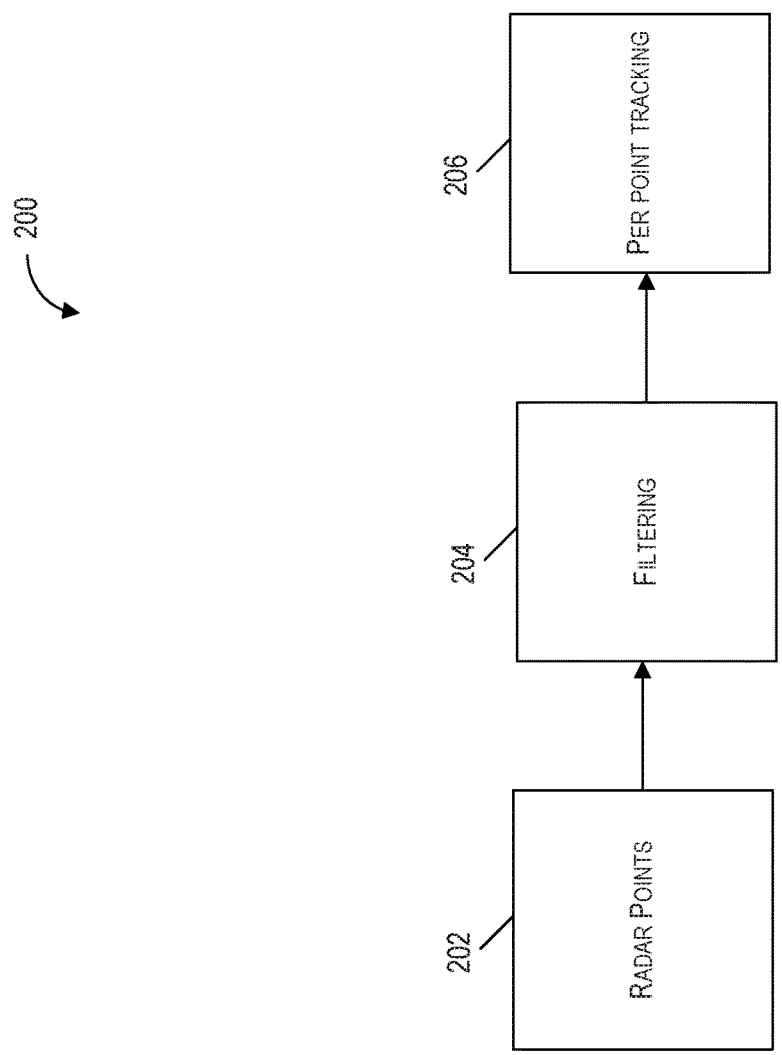
FIG. 2 depicts an example of sensor output segmentation according to example embodiments of the present disclosure.

FIG. 2 depicts an example of sensor output segmentation according to example embodiments of the present disclosure. One or more operations and/or functions in FIG. 2 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 2 can include one or more features of one or more devices and/or systems including, for example, the operations computing system 104, the vehicle 108, or the vehicle computing system 112, which are depicted in FIG. 1.

As illustrated, FIG. 2 shows an example of sensor output segmentation 200 including obtaining radar points 202, performing filtering operations 204, and generating per point tracking output 206. At 202, a vehicle (e.g., the vehicle 108) configured with one or more radar devices (e.g., radar devices included as part of the one or more sensors 114) mounted on some portion of the vehicle (e.g., on the roof, or front-end of the vehicle) can detect the environment surrounding the vehicle. Detection of the environment can be based on radar points that are part of a plurality of sensor data returns generated by the one or more radar devices. Further, the radar points can indicate the range, angle, and velocity of one or more objects that are detected in the environment. In some embodiments, the sensor data returns described herein can include and/or be associated with the radar points described at 202.

At 204, a computing system (e.g., the vehicle computing system 112) associated with the vehicle can perform one or more filtering operations. For example, the one or more filtering operations can include operations that can filter noise in the form of signals generated by the computing device itself; and interference resulting from external sources that generate noise in the form of signals that are not associated with a detected object in the environment. In some embodiments, the one or more filtering operations can be performed as part of associating the plurality of sensor data returns with a plurality of bins corresponding to a field of view as described herein.

At, 206 per point tracking output can be generated. For example, the per point tracking output can include information associated with the range and azimuth of each of the radar points obtained at 202. The per point tracking output can then be used by various systems including vehicle computing systems that use the per point tracking output to determine the location of objects in an environment.

Figure 3:
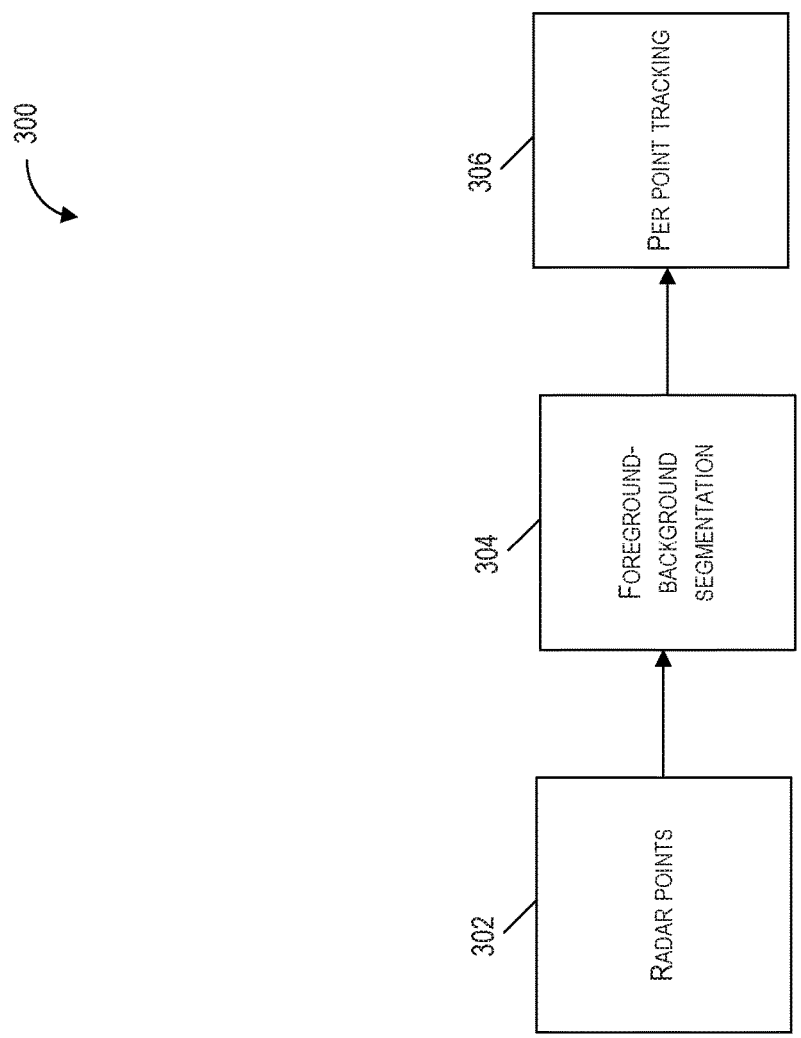
FIG. 3 depicts an example of sensor output segmentation according to example embodiments of the present disclosure.

FIG. 3 depicts an example of sensor output segmentation according to example embodiments of the present disclosure. One or more operations and/or functions in FIG. 3 can be implemented and/or performed by one or more devices (e.g., one or more computing devices) and/or systems including, for example, the operations computing system 104, the vehicle 108, or the vehicle computing system 112, which are depicted in FIG. 1. Further, the one or more devices and/or systems in FIG. 3 can include one or more features of one or more devices and/or systems including, for example, the operations computing system 104, the vehicle 108, or the vehicle computing system 112, which are depicted in FIG. 1.

As illustrated, FIG. 3 shows an example of sensor output segmentation 300 including obtaining radar points 302, performing foreground-background segmentation 304, and generating per point tracking output 306.

At 302, a vehicle (e.g., the vehicle 108) can be configured with one or more sensor devices (e.g., one or more radar devices included as part of the one or more sensors 114) that can detect the environment surrounding the vehicle. Detection of the environment can be based on one or more radar points (e.g., a point associated with a location of an object in an environment based on the distance and azimuth of the point relative of the one or more radar devices) that are part of a plurality of sensor data returns generated by the one or more radar devices. Further, the one or more radar points can indicate the range, and velocity of one or more objects that are detected in the environment. For example, an automobile with a roof mounted radar device can detect objects such as pedestrians, vehicles, the road, and other objects that are around the vehicle. Further, the sensor data returns generated by the radar device can include a plurality of radar points that can be used to determine the distance, location, and velocity of the detected objects. In some embodiments, the sensor data returns described herein can include and/or be associated with the radar points described at 302.

At 304, foreground-background segmentation can be performed. Foreground-background segmentation can include using the radar points obtained at 302 as part of an input for a machine-learned segmentation model that has been configured and/or trained to generate one or more semantic segments based on the input. The one or more semantic segments generated by the machine-learned segmentation model can include one or more foreground segments. In some embodiments, the one or more foreground segments can indicate one or more portions of the environment represented by the sensor data returns that are determined to be significant, including vehicles, pedestrians, cyclists, and moving objects. In some embodiments, the one or more foreground segments are those portions of a representation of an environment (e.g., an image of an environment) that do not include one or more background portions of the environment associated with the sensor data returns that are determined not to be significant. In some embodiments, the foreground-background segmentation performed at 304 can include one or more operations using the machine-learned segmentation model described herein.

At 306, the per point tracking output can include information associated with the location of each of the radar points obtained at 302. The per point tracking output can then be used by various systems including vehicle computing systems that use the per point tracking output to determine the location of objects in an environment. For example, the per point tracking output can be used by a perception system of an autonomous vehicle to determine the location of one or more objects in an environment. In some embodiments, the per point tracking output can include the semantic segment and/or the one or more sensor detection outputs that are described herein.

Figure 4:
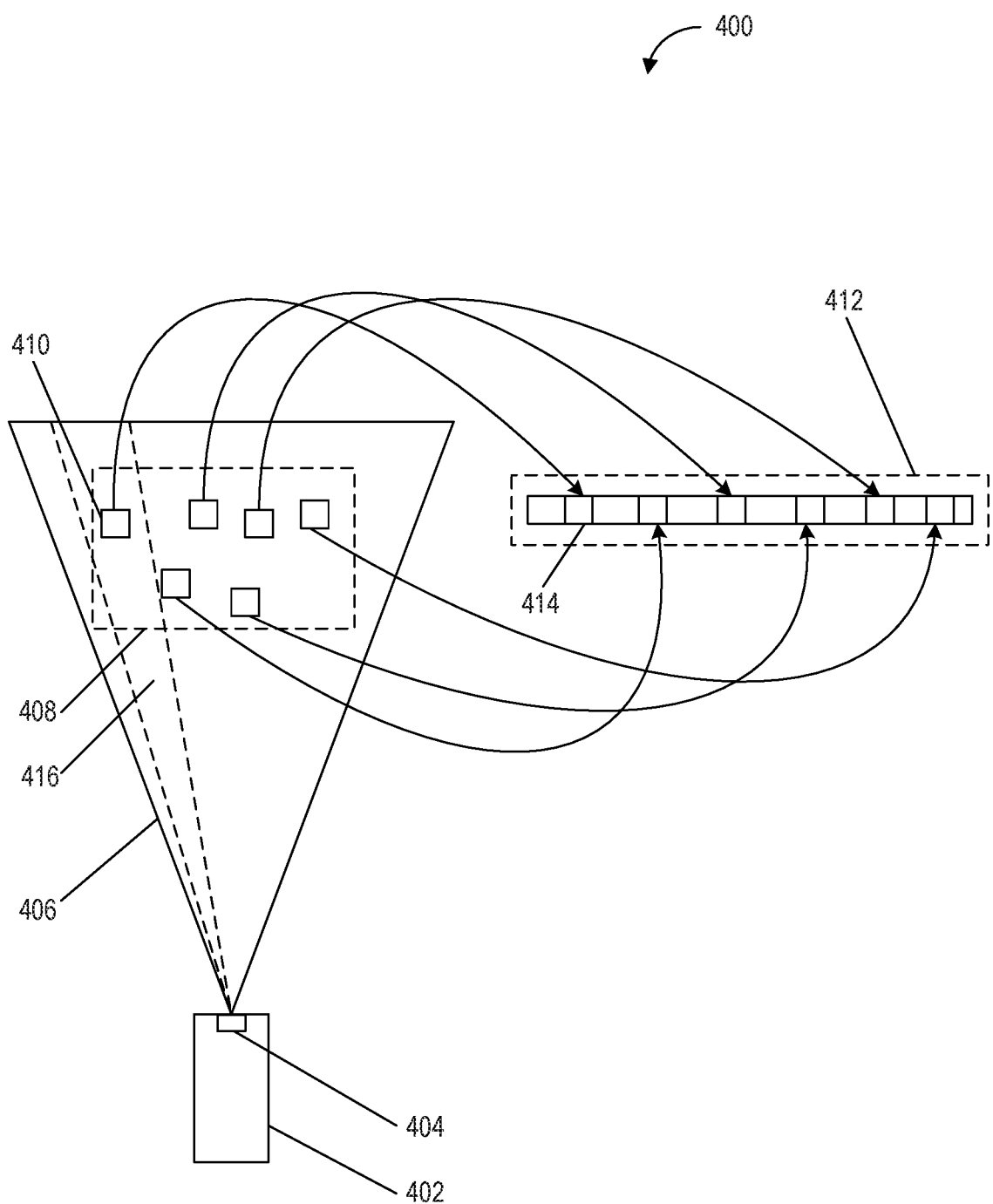
FIG. 4 depicts an example of sensor output segmentation using a single sensor according to example embodiments of the present disclosure.

FIG. 4 depicts an example of sensor output segmentation using a single sensor according to example embodiments of the present disclosure. One or more operations and/or functions in FIG. 4 can be implemented and/or performed by one or more devices (e.g., one or more computing devices) and/or systems including, for example, the operations computing system 104, the vehicle 108, or the vehicle computing system 112, which are depicted in FIG. 1.

As illustrated, FIG. 4 shows an environment 400 that includes a vehicle 402, a sensor 404, a field of view 406, a plurality of sensor data returns 408, a sensor data return 410, a plurality of bins 412, a bin 414, and a portion of the field of view 416.

In this example, the vehicle 402 (e.g., a vehicle with one or more aspects of the vehicle 108) is configured to include the sensor 404 (e.g., a sensor with one or more aspects of the one or more sensors 114 including one or more radar devices) mounted on a front portion of the vehicle 402. The sensor 404 can detect a portion of the environment across the field of view 406. The field of view 406 can include any field of view that is detected by the sensor 404 (e.g., a three-hundred and sixty degree field of view around the vehicle 402 or a field of view that is less than three-hundred and sixty degrees).

Within the field of view 406, the sensor 404 can detect objects and generate the plurality of sensor data returns 408 each of which can include information associated with the detected objects including the location of the detected object. Further, the field of view 406 can include one or more portions that can be the same size or that can be different sizes. For example, the field of view 406 can cover one-hundred and twenty degrees and can be divided into one-thousand two hundred evenly sized portions of a tenth of a degree each. Further, the one or more portions of the field of view 406 can the portion of the field of view 416. The plurality of sensor data returns 408 can include the sensor data return 410 which is associated with detection of an object within the portion of the field of view 416. In some embodiments, the field of view 406 can include any aspect of the field of view of the at least one sensor described herein. Furthermore, in some embodiments, the plurality of sensor data returns 408 can include any of the aspects of the sensor data returns described herein.

The plurality of bins 412 can be associated with the field of view 406. Further, each of the plurality of bins 412 can be associated with a respective portion of the field of view 406 and/or a respective sensor data return that is associated with the respective portion of the field of view 406. For example, the bin 414 can be associated with the sensor data return 410 and the portion of the field of view 416. In some embodiments, the plurality of bins 412 can include any aspect of the plurality of bins described herein.

A computing system (e.g., the vehicle computing system 112) can determine the location and/or velocity of objects detected in an environment based on the association of the plurality of the plurality of sensor data returns 408 with the respective plurality of bins 412.

Figure 5:
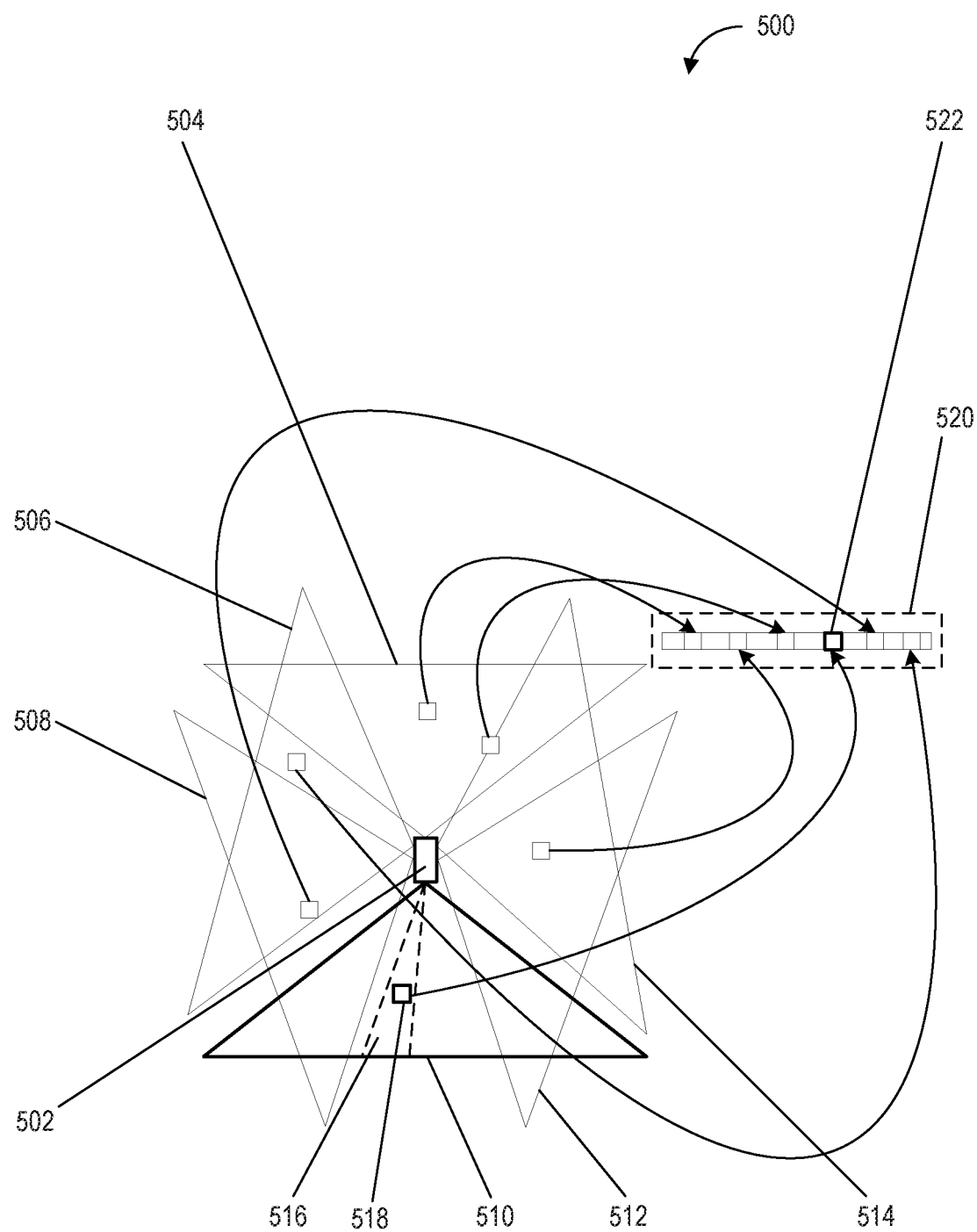
FIG. 5 depicts an example of sensor output segmentation using multiple sensors according to example embodiments of the present disclosure.

FIG. 5 depicts an example of sensor output segmentation using multiple sensors according to example embodiments of the present disclosure. One or more operations and/or functions in FIG. 5 can be implemented and/or performed by one or more devices (e.g., one or more computing devices) and/or systems including, for example, the operations computing system 104, the vehicle 108, or the vehicle computing system 112, which are depicted in FIG. 1.

As illustrated, FIG. 5 shows an environment 500 that includes a vehicle 502 (e.g., the vehicle 108 that is depicted in FIG. 1), a field of view 504, a field of view 506, a field of view 508, a field of view 510, a field of view 512, a field of view 514, a portion of the field of view 516, a sensor data return 518, a plurality of bins 520, and a bin 522.

In this example, the vehicle 502 (e.g., a vehicle with one or more aspects of the vehicle 108) is configured to include a plurality of sensors (not shown) mounted on different portions of the vehicle 502. In this example, the vehicle 502 is configured with six sensors including a single sensor at the front side of the vehicle 502 that is associated with the field of view 504, two sensors on the left side of the vehicle 502 that are associated with the field of view 506 and the field of view 508 respectively, a single sensor at the rear side of the vehicle 502 that is associated with the field of view 510, and two sensors on the right side of the vehicle 502 that are associated with the field of view 512 and the field of view 514 respectively. As shown, the fields of view 504-514 cover three-hundred and sixty degrees around the vehicle 502 and each of the fields of view 504-514 overlap two of the other fields of view 504-514. In some embodiments, the fields of view 504-514 can overlap more than two of the other fields of view 504-514. Further, in some embodiments, some of the fields of view 504-514 overlap and others do not. Furthermore, in some embodiments, the fields of view 504-514 do not overlap.

Each of the fields of view 504-514 can detect a portion of the environment around the vehicle 502. Within the field of view 510 (at the rear of the vehicle 502), the sensor at the rear of the vehicle 502 can detect objects and generate a plurality of sensor data returns including the sensor data return 518. Further, each of the plurality of sensor data returns including the sensor data return 518 can indicate the location of an object including a range and azimuth associated with the object.

The field of view 510 can include one or more portions. For example, the field of view 510 can cover eighty degrees and can be divided into eight hundred portions of a tenth of a degree each. The field of view 510 can include the portion of the field of view 516 which can be associated with the sensor data return 518. In some embodiments, any of the fields of view 504-514 can include any aspect of the field of view of the at least one sensor described herein. Furthermore, in some embodiments, the sensor data return 518 can include any of the aspects of the sensor data returns described herein.

The plurality of bins 520 can be associated with the fields of view 504-514. Further, each of the plurality of bins 520 can be associated with a respective portion of the fields of view 504-514 and/or a respective sensor data return that is associated with the respective portion of the fields of view 504-514. For example, the bin 522 can be associated with the sensor data return 518 and the portion of the field of view 516. In some embodiments, the plurality of bins 520 can include any aspect of the plurality of bins described herein.

A computing system (e.g., the vehicle computing system 112) can determine the location and/or velocity of objects detected in an environment based on the association of the plurality of the plurality of sensor data returns 518 with the respective plurality of bins 520.

Figure 6:
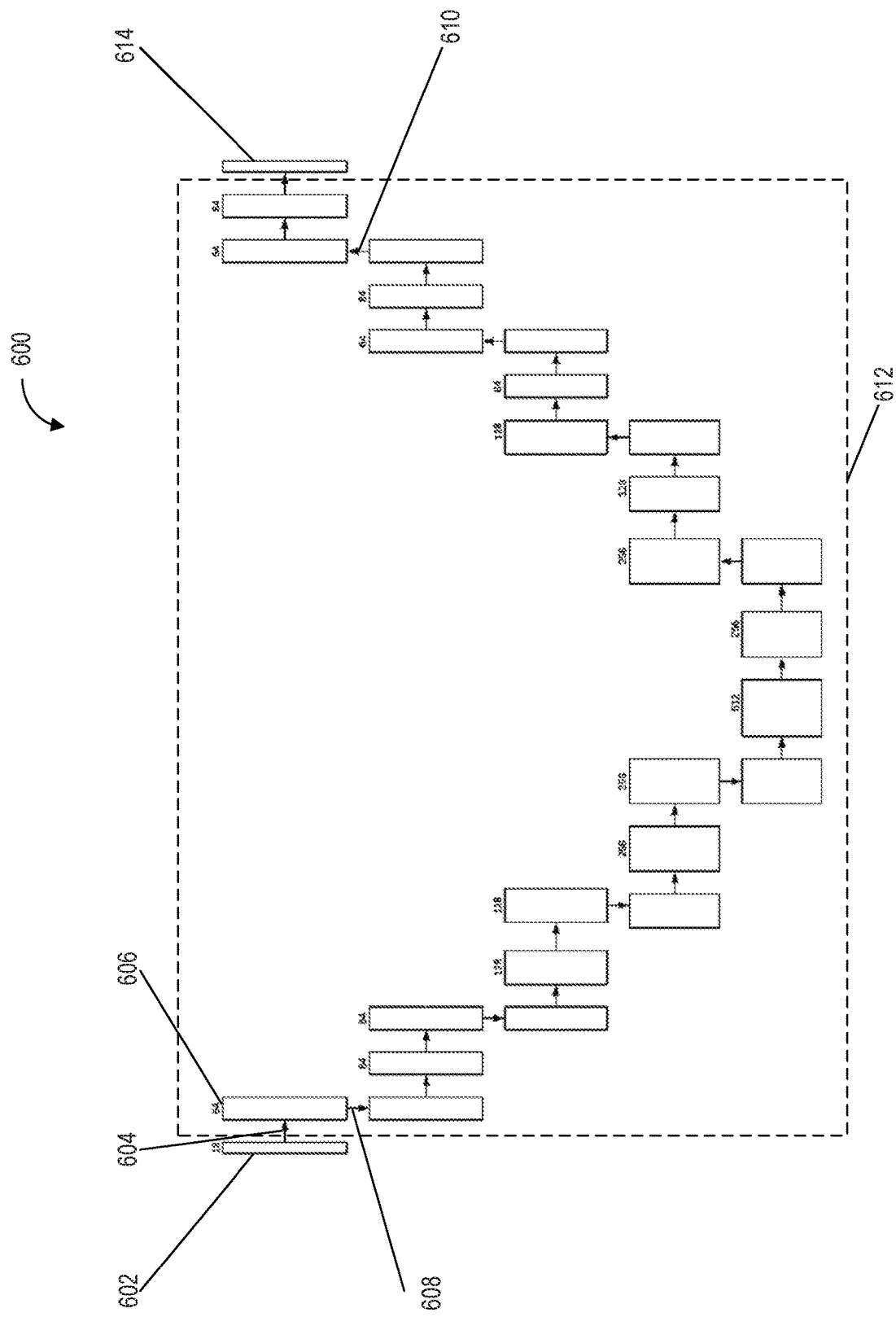
FIG. 6 depicts an example of a convolutional neural network used to perform sensor output segmentation according to example embodiments of the present disclosure.

FIG. 6 depicts an example of a computing system including a convolutional neural network used to perform sensor output segmentation according to example embodiments of the present disclosure. One or more operations, actions, and/or events depicted in FIG. 6 can be implemented or performed by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 6 shows a computing system 600 that includes input data 602, convolution 604, a feature map 606, pooling operation 608, one or more transposed convolutions 610, operations 612, and output data 614.

In some embodiments, the computing system 600 including one or more machine-learned models (e.g., one or more convolutional neural networks) configured to perform operations on data provided as input to the computing system 600.

The input data 602 can include a feature vector that is associated with sensor data including one or more sensor data returns. For example, the input data can include one or more sensor data returns associated with a set of radar points generated by a radar device. Further, the feature vector can include one or more features including a range (e.g., distance in meters), azimuth, and/or a signal to noise ratio. In some embodiments, the input data 602 can include any aspect of the plurality of channels and/or the training data that are described herein.

The convolution 604 can include one or more operations performed on an input which can include the input data 602. The convolution 604 can include applying a filter (e.g., kernel) to the input to extract features of the input and generate the feature map 606 that includes one or more transformed features.

The pooling operations 608 can be performed on the feature map 606 to reduce the size of the feature map 606. For example, the pooling operations 608 can be used to down sample the feature map 606. In some embodiments, the pooling operations 608 can include one or more max pooling operations.

The operations 610 can include one or more convolutions including the convolution 604; and one or more pooling operations including the pooling operations 608; that are performed on one or more feature maps including the feature map 606.

The output data 612 can include an output that is based on the operations 610. For example, the output data 612 can include one or more semantic segments that indicate objects detected in an environment based on the sensor data associated with the feature vector in the input data 602. In some embodiments, the output data 612 can include any aspect of the semantic segment and/or the one or more foreground segments described herein.

Figure 7:
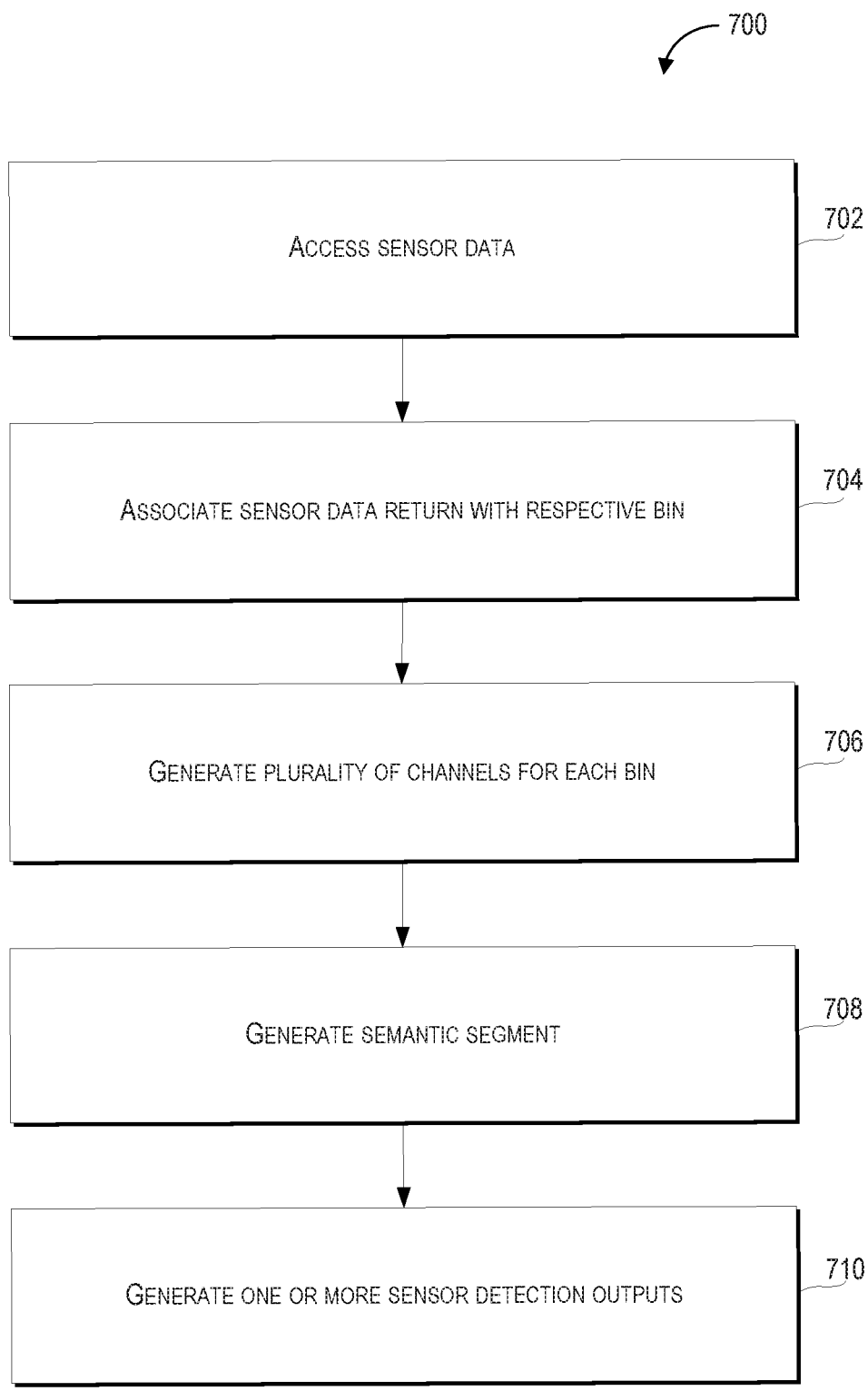
FIG. 7 depicts a flow diagram of an example method of sensor output segmentation according to example embodiments of the present disclosure.

FIG. 7 depicts a flow diagram of an example method of sensor output segmentation according to example embodiments of the present disclosure. One or more portions of a method 700 can be implemented by one or more devices (e.g., one or more computing devices) or systems including, for example, the operations computing system 104, the vehicle 108, or the vehicle computing system 112, shown in FIG. 1. Moreover, one or more portions of the method 700 can be implemented as an algorithm on the hardware components of the devices described herein (e.g., as in FIG. 1). FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 702, the method 700 can include accessing sensor data. The sensor data can include a plurality of sensor data returns representative of an environment detected by at least one sensor across a field of view of the at least one sensor. In some embodiments, the sensor data returns can be based at least in part on one or more sensor outputs from one or more sensors including one or more radar devices, one or more light detection and ranging (LIDAR) devices, one or more cameras, one or more sonar devices, and/or one or more thermal sensors. For example, the vehicle computing system 112 can access sensor data generated by the one or more sensors 114 including one or more radar devices that detect one or more objects external to the vehicle 108.

In some embodiments, the at least one sensor can include a plurality of sensors that can be configured to detect various fields of view. The fields of view detected by each of the plurality of sensors can be the same or different; overlapping or non-overlapping. Further, the field of view of the at least one sensor can detect any portion of the environment. For example, the field of view of the at least one sensor can detect a three-hundred and sixty degree field of view around the at least one sensor. By way of further example, the at least one sensor can include four sensors, with a total field of view of three-hundred and sixty degrees around the vehicle 108. Further, each of the four sensors can be respectively mounted on the four corners of the vehicle 108 and have a one-hundred degree field of view that overlaps two of the other sensors by five degrees such that each sensor covers a non-overlapping ninety degree field of view.

In some embodiments, the sensor data can include a range and/or an azimuth associated with the one or more objects that are detected by the at least one sensor. The plurality of sensor data returns can be used to determine one or more features of one or more objects in the environment including one or more velocities of the one or more objects, one or more accelerations of the one or more objects, one or more headings of the one or more objects, and/or one or more physical dimensions of the one or more objects.

At 704, the method 700 can include associating a sensor data return of the plurality of sensor data returns with a respective bin of a plurality of bins. The plurality of bins can correspond to the field of view of the at least one sensor. In some embodiments, each bin of the plurality of bins can correspond to a different portion of the field of view of the at least one sensor. For example, the vehicle computing system 112 can associated each sensor data return with a respective bin. By way of further example, each of the plurality of sensor data returns can be associated with a corresponding plurality of radar points. Further, the field of view of the at least one sensor can be a one-hundred and sixty degree field of view that is divided into one-thousand six-hundred equally sized, non-overlapping, bins that each correspond to one-tenth of a degree of the field of view. When a portion of the field of view (e.g., a tenth of a degree portion) is associated with a sensor data return, that sensor data return can be associated with the bin that corresponds to that portion of the field of view. Furthermore, associating each sensor data return with each respective bin can be performed for each of the plurality of sensor data returns and each of the plurality of bins.

In some embodiments, when multiple sensor data returns can be associated with the same bin, the sensor data return that is closest in distance to the at least one sensor can be associated with the bin.

At 706, the method 700 can include generating a plurality of channels for each bin of the plurality of bins. The plurality of channels for each bin can include data indicative of a range and/or an azimuth associated with at least one sensor data return associated with each bin. For example, the vehicle computing system 112 can generate a range channel and an azimuth channel for each of the plurality of bins. The range channel can indicate the distance in meters of a detected object in the environment from the at least one sensor. The azimuth channel can indicate an angle in degrees of a detected object in the environment relative to the at least one sensor.

In some embodiments, the plurality of channels for each bin can include an ego-motion compensated velocity, a signal to noise ratio, and/or an indication of whether an object was detected.

At 708, the method 700 can include generating a semantic segment. In some embodiments, the semantic segment is based at least in part on a portion of the sensor data representative of the environment. For example, the vehicle computing system 112 can generate one or more semantic segments including a semantic segment that is associated with a vehicle in the environment.

In some embodiments, generating the semantic segment can include inputting data including the plurality of channels for each bin into a machine-learned segmentation model. The machine-learned segmentation model can be trained to segment at least a portion of the plurality of sensor data returns based at least in part on the data comprising the plurality of channels for each bin of the plurality of bins. Further, the machine-learned segmentation model can be configured and/or trained to generate at least one output including the semantic segment.

At 710, the method 700 can include generating one or more sensor detection outputs. The one or more sensor detection outputs can include information associated with the semantic segment. The semantic segment can include one or more foreground segments. The one or more outputs can include one or more predicted object states that can be based at least in part on the one or more predicted locations of the one or more objects at the one or more subsequent time intervals. For example, the vehicle computing system 112 can generate one or more outputs including one or more semantic segments associated with the location of one or more objects external to the vehicle 108.

By way of further example, the vehicle computing system 112 can generate one or more outputs including one or more control signals that can be used by a perception system of a vehicle and/or to perform one or more operations associated with activating and/or controlling one or more vehicle systems of the vehicle 108.

Figure 8:
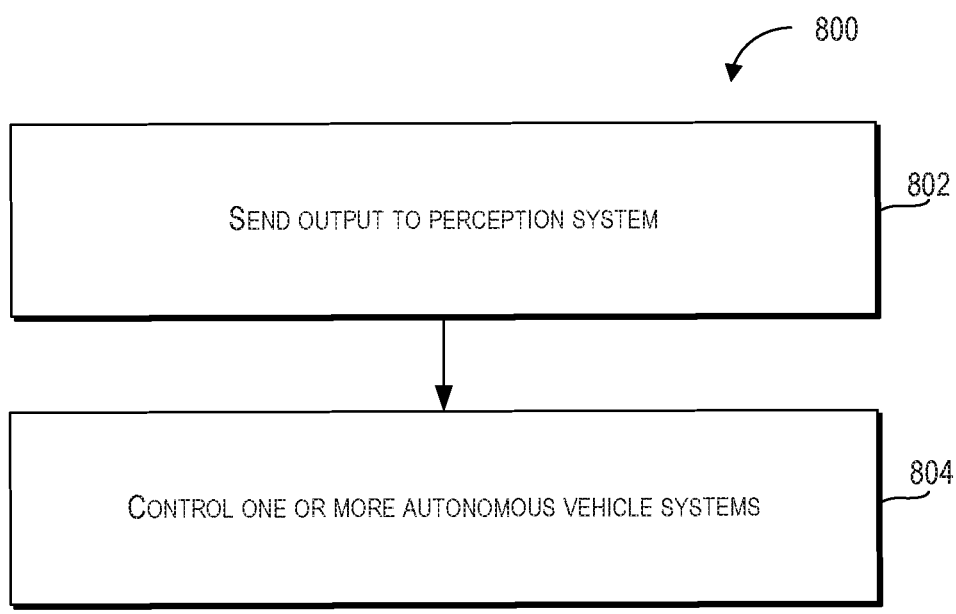
FIG. 8 depicts a flow diagram of an example method of sensor output segmentation according to example embodiments of the present disclosure.

FIG. 8 depicts a flow diagram of an example method of sensor output segmentation according to example embodiments of the present disclosure. One or more portions of a method 800 can be implemented by one or more devices (e.g., one or more computing devices) or systems including, for example, the operations computing system 104, the vehicle 108, or the vehicle computing system 112, shown in FIG. 1. Moreover, one or more portions of the method 800 can be implemented as an algorithm on the hardware components of the devices described herein (e.g., as in FIG. 1). In some embodiments, one or more portions of the method 800 can be performed as part of the method 700 that is depicted in FIG. 7. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 802, the method 800 can include sending output to a perception system. The output can include the semantic segment and/or the one or more sensor detection outputs. The perception system can be configured to use the at least one output to determine one or more locations of one or more objects in the environment. For example, the output including the one or more sensor detection outputs can be sent to the perception system 124.

At 804, the method 800 can include controlling one or more autonomous vehicle systems. Controlling the one or more autonomous vehicle systems can be based at least in part on the at least one output. The one or more autonomous vehicle systems can include one or more engine systems, one or more motor systems, one or more steering systems, one or more braking systems, one or more electrical systems, and/or one or more communications systems. For example, the vehicle computing system 112 can use the output to determine one or more locations and/or paths of objects in the environment traversed by the vehicle 108. The computing system can then control a braking system of the vehicle 108 and use the braking system to stop the vehicle 108 based at least in part on the locations and/or paths of the objects.

Figure 9:
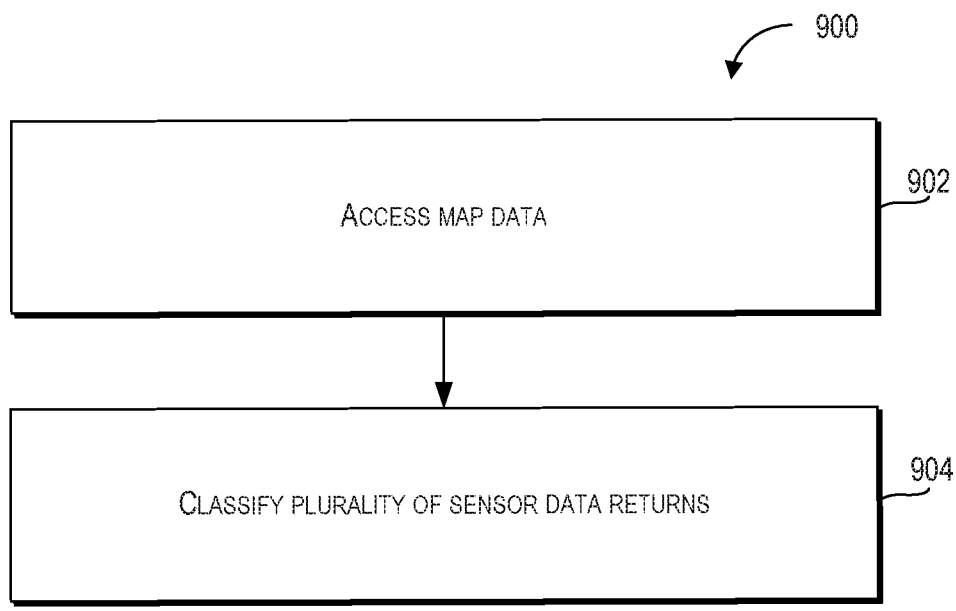
FIG. 9 depicts a flow diagram of an example method of sensor output segmentation according to example embodiments of the present disclosure.

FIG. 9 depicts a flow diagram of an example method of sensor output segmentation according to example embodiments of the present disclosure. One or more portions of a method 900 can be implemented by one or more devices (e.g., one or more computing devices) or systems including, for example, the operations computing system 104, the vehicle 108, or the vehicle computing system 112, shown in FIG. 1. Moreover, one or more portions of the method 900 can be implemented as an algorithm on the hardware components of the devices described herein (e.g., as in FIG. 1). In some embodiments, one or more portions of the method 900 can be performed as part of the method 700 that is depicted in FIG. 7. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include accessing map data. The map data can include information associated with one or more portions of the environment that are classified as foreground (e.g., one or more foreground portions of the environment) or background (e.g., one or more background portions of the environment). The map data can include information indicating the one or more background portions of the environment (e.g., roads, housing, bodies of water, forest, and/or parkland) and the one or more foreground portions of the environment (e.g., the one or more portions of the environment that are not background). For example, the vehicle computing system 112 can access map data that includes satellite imagery of an environment including the geographic area in which the vehicle 108 is located. Further, one or more portions of the satellite imagery such as sidewalks and forests can be classified as background and the remaining one or more portions of the satellite imagery can be classified as foreground.

At 904, the method 900 can include classifying one or more portions of the plurality of sensor data returns as foreground based at least in part on the map data. In some embodiments, the one or more portions of the plurality of sensor data returns that are associated with the same location as the one or more foreground portions of the environment can be classified as foreground.

For example, the vehicle computing system 112 can compare the one or more foreground portions of the environment to the plurality of sensor data returns and determine the plurality of sensor data returns that are in the same location as the one or more portions foreground portions. The vehicle computing system 112 can then classify as foreground, the one or more portions of the plurality of sensor data returns that are associated with the same location as the one or more portions of the environment that are classified as foreground.

Figure 10:
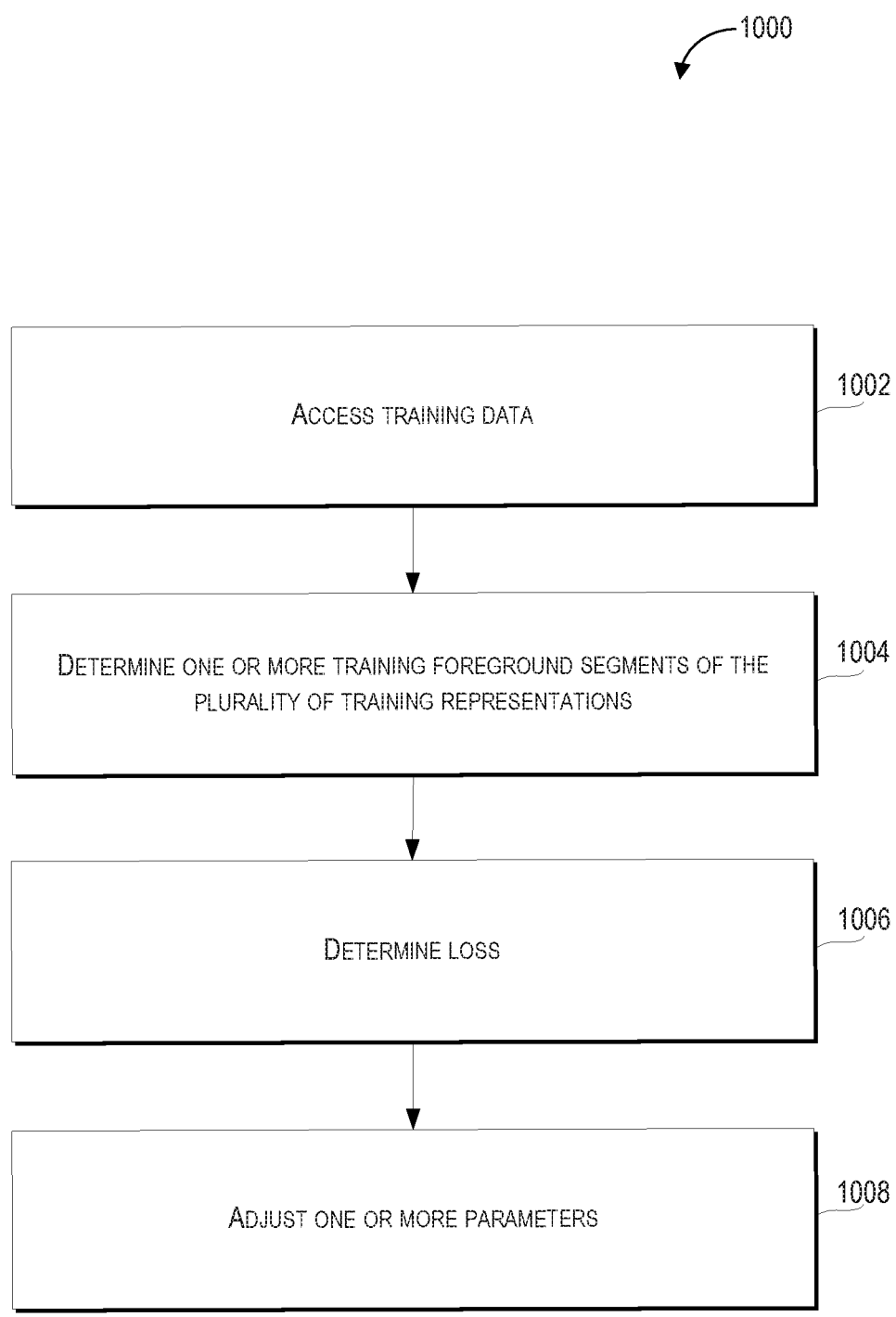
FIG. 10 depicts a flow diagram of an example method of sensor output segmentation according to example embodiments of the present disclosure.

FIG. 10 depicts a flow diagram of an example method of sensor output segmentation according to example embodiments of the present disclosure. One or more portions of a method 1000 can be implemented by one or more devices (e.g., one or more computing devices) or systems including, for example, the operations computing system 104, the vehicle 108, or the vehicle computing system 112, shown in FIG. 1. Moreover, one or more portions of the method 1000 can be implemented as an algorithm on the hardware components of the devices described herein (e.g., as in FIG. 1). In some embodiments, one or more portions of the method 1000 can be performed as part of the method 700 that is depicted in FIG. 7. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1002, the method 1000 can include accessing training data. The training data can include a plurality of training feature vectors. The plurality of training vectors can be respectively associated with a plurality of training representations (e.g., images of an environment) and/or one or more features of each of the plurality of training representations. For example, the operations computing system 104 can access training data stored in one or more storage devices of the operations computing system 104 and/or training data remotely stored in the one or more remote computing devices 106.

The training data can include type of information included in the sensor data. For example, the training data can include a plurality of sensor data returns. Further, the training data can include any combination of sensor data based on real-world object detections; and/or artificially generated sensor data that is based at least in part on the simulated detection of one or more simulated objects in a simulated environment.

The plurality of training feature vectors included in the training data can include information associated with one or more features including a range (e.g., distance in meters) and/or an azimuth associated with detection of an object in an environment by a sensor device. Furthermore, the plurality of training feature vectors can include information associated with a plurality of channels and/or a plurality of bins associated with each of a plurality of sensor data returns included in the training data.

At 1004, the method 1000 can include determining one or more training foreground segments of the plurality of training representations. The one or more training foreground segments can be based at least in part on the plurality of training feature vectors and the machine-learned segmentation model. Further, the one or more training foreground segments can indicate one or more portions of the plurality of training representations that are significant to a perception system and/or other autonomous vehicle system that is used to detect and/or identify one or more objects in an environment.

In some embodiments, generating the one or more training foreground segments can include inputting data including the plurality of training feature vectors into a machine-learned segmentation model. The machine-learned segmentation model can be trained to segment at least a portion of the plurality of sensor data returns included in the training data based at least in part on the data comprising the plurality of channels for each bin of the plurality of bins in the training data. Further, the machine-learned segmentation model can be configured and/or trained to generate at least one output including the one or more training foreground segments.

At 1006, the method 1000 can include determining a loss. The loss can be based at least in part on one or more comparisons of the one or more training foreground segments of the plurality of training representations to one or more ground-truth foreground segments. The one or more comparisons can be used to determine one or more differences and/or similarities between the one or more training foreground segments and the one or more ground-truth foreground segments.

For example, the operations computing system 104 can perform one or more operations to evaluate one or more loss functions associated with the loss. The one or more loss functions can use input including the information associated with the one or more training foreground segments and the one or more ground-truth foreground segments. The operations computing system 104 can then compare the inputs to determine differences and/or similarities in the one or more features of the inputs including, for example, the differences and/or similarities in: the distances between the inputs; the azimuth associated with the inputs; the signal to noise ratio associated with the inputs; the physical dimensions of the inputs; the velocities of the inputs; and/or the accelerations of the inputs.

At 1008, the method 1000 can include adjusting one or more parameters of the machine-learned segmentation model. The one or more parameters of the machine-learned segmentation model can be adjusted based at least in part on the loss. The one or more parameters of the one or more machine-learned segmentation models can be adjusted (e.g., weighted differently) based at least in part on the contributions that each of the one or more parameters make towards minimizing the loss. Minimization of the loss can be positively correlated with more accurate segmentation in which the one or more training foreground segments are more similar to the one or more ground-truth foreground segments.

By way of example, the operations computing system 104 can determine that the one or more parameters of the one or more machine-learned segmentation models that do not change the loss may be kept the same; the one or more parameters that decrease the loss can be weighted more heavily (e.g., adjusted to increase their contribution to the loss); and the one or more parameters that increase the loss can have their weighting reduced (e.g., adjusted to reduce their contribution to the loss). By way of further example, if the operations computing system 104 determines that the parameters associated with the range channel associated with a bin makes a greater contribution to minimizing the loss than the parameters associated with the signal to noise ratio channel associated with a bin, then the parameters associated with the range channel will be weighted more heavily than the parameters associated with the signal to noise ratio associated with a bin.

FIG. 11 depicts a diagram of an example system according to example embodiments of the present disclosure. One or more operations and/or functions in FIG. 12 can be implemented and/or performed by one or more devices (e.g., one or more computing devices) or systems including, for example, the operations computing system 104, the vehicle 108, or the vehicle computing system 112, which are shown in FIG. 1. Further, the one or more devices and/or systems in FIG. 11 can include one or more features of one or more devices and/or systems including, for example, the operations computing system 104, the vehicle 108, or the vehicle computing system 112, which are depicted in FIG. 1.

Various means can be configured to perform the methods and processes described herein. For example, a foreground-background segmentation system 1100 can include one or more data accessing units 1102, one or more sensor data association units 1104, one or more channel generation units 1106, one or more semantic segmentation units 1108, one or more output generation units 1110, one or more loss determination units 1112, one or more parameter adjustment units 1114, one or more device control units 1116, and/or other means for performing the operations and functions described herein. In some implementations, one or more of the units may be implemented separately. In some implementations, one or more units may be a part of, or included in, one or more other units. These means can include one or more processors, one or more microprocessors, one or more graphics processing units, one or more logic circuits, one or more dedicated circuits, one or more application-specific integrated circuits (ASICs), programmable array logic, one or more field-programmable gate arrays (FPGAs), one or more controllers, one or more microcontrollers, and/or other suitable hardware. The means can also, or alternately, include software control means implemented with a processor or logic circuitry for example. The means can include or otherwise be able to access memory including, for example, one or more non-transitory computer-readable storage media, such as random-access memory, read-only memory, electrically erasable programmable read-only memory, erasable programmable read-only memory, one or more flash/other memory devices, one or more data registrars, one or more databases, and/or other suitable hardware.

The means can be programmed (e.g., an FPGA custom programmed to operate a semantic segmentation system) or configured (e.g., an ASIC custom designed and configured to operate a semantic segmentation system) to perform one or more algorithms for performing the operations and functions described herein. For example, the means (e.g., the one or more data accessing units 1102) can be configured to access sensor data. The sensor data can be associated with radar output of at least one radar device that detects one or more distances and angles of one or more objects relative to the at least one radar device across a field of view of the at least one radar device.

In some embodiments, the one or more data accessing units 1102 can be configured to access training data. The training data can include a plurality of training feature vectors respectively associated with a plurality of training representations and one or more features of each of the plurality of training representations.

In some embodiments, the one or more data accessing units 1102 can be configured to access map data that can include information associated with one or more portions of the environment that are classified as foreground or background.

In some embodiments, the one or more data accessing units 1102 can be configured to access a set of sensor data returns including the plurality of sensor data returns.

The means (e.g., the one or more sensor data association units 1104) can be configured to associate data. The one or more sensor data association units 1104 can associate each sensor data return of the plurality of sensor data returns with a respective bin of a plurality of bins corresponding to the field of view of the at least one sensor. Each bin can correspond to a different portion of the field of view of the at least one sensor.

In some embodiments, the one or more sensor data association units 1104 can be configured to rasterize at least a portion of the plurality of two-dimensional sensor data returns into a single dimension.

In some embodiments, the one or more sensor data association units 1104 can be configured to discard the two-dimensional sensor data returns that were not selected from the plurality of bins and generate a rasterized data output indicative of a plurality of selected two-dimensional sensor data returns from the plurality of bins.

The means (e.g., the one or more channel generation units 1106) can be configured to generate a plurality of channels for each bin of the plurality of bins. The plurality of channels for each bin can include data indicative of a range and an azimuth associated with at least one sensor data return associated with such bin.

The means (e.g., the one or more semantic segmentation units 1108) can be configured to generate a semantic segment of at least a portion of the sensor data representative of the environment by inputting the plurality of channels for each bin into a machine-learned segmentation model trained to segment at least a portion of the plurality of sensor data returns based at least in part on input comprising the plurality of channels for each bin of the plurality of bins. The machine-learned segmentation model can generate at least one output including one or more semantic segments (e.g., a semantic segment).

In some embodiments, the one or more semantic segmentation units 1108 can be configured to determine that the plurality of sensor data returns are associated with the one or more portions of the environment that are classified as foreground.

The means (e.g., the one or more output generation units 1110) can be configured to generate one or more sensor detection outputs including information associated with the one or more semantic segments. Further, the one or more semantic segments generated by the one or more output generation units 1110 can include one or more foreground segments.

The means (e.g., the one or more loss determination units 1112) can be configured to determine a loss based at least in part on one or more comparisons of the one or more training foreground segments of the plurality of training representations to one or more ground-truth foreground segments.

In some embodiments, the one or more loss determination units 1112 can be configured to determine the loss based at least in part on an accuracy of the one or more training foreground segments of the plurality of training representations. The accuracy can be positively correlated with a proportion of the one or more training foreground segments that correspond to the one or more ground-truth foreground segments. Further, loss can be inversely correlated with the accuracy.

The means (e.g., the one or more parameter adjustment units 1114) can be configured to adjust one or more parameters of a machine-learned segmentation model based at least in part on a loss.

The means (e.g., the one or more device control units 1116) can be configured to send the at least one output to a perception system of the autonomous vehicle. In some embodiments, the one or more device control units 1116 can be configured to control one or more autonomous vehicle systems of the autonomous vehicle based at least in part on the at least one output.

Figure 12:
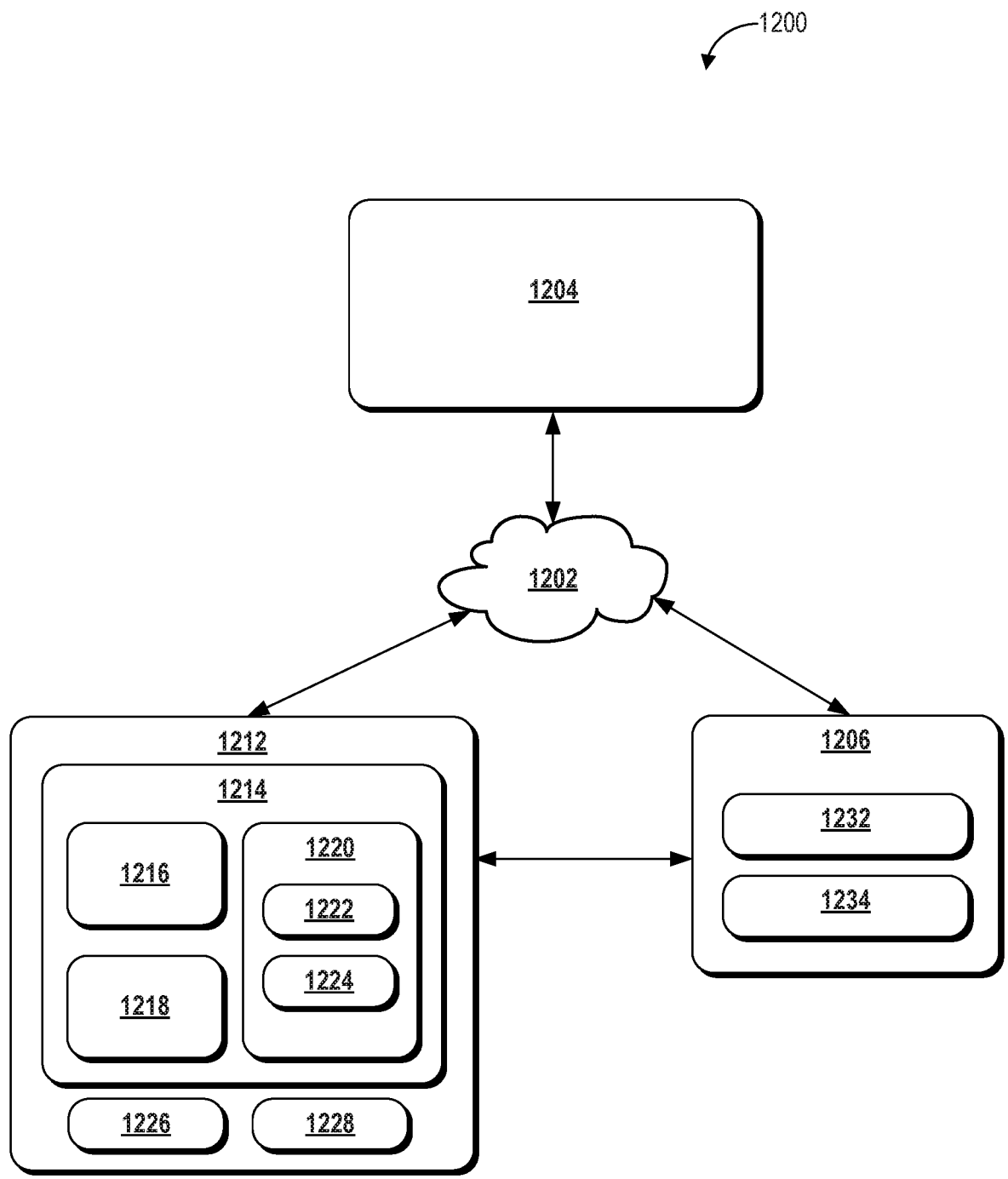
FIG. 12 depicts a diagram of an example system according to example embodiments of the present disclosure.

FIG. 12 depicts a diagram of an example system according to example embodiments of the present disclosure. A system 1200 can include a network 1202 which can include one or more features of the communications network 102 depicted in FIG. 1; an operations computing system 1204 which can include one or more features of the operations computing system 104 depicted in FIG. 1; one or more remote computing devices 1206 which can include one or more features of the one or more remote computing devices 106 depicted in FIG. 1; a vehicle computing system 1212 which can include one or more features of the vehicle computing system 112 depicted in FIG. 1; one or more computing devices 1214; a communication interface 1216; one or more processors 1218; one or more memory devices 1220; memory system 1222; memory system 1224; one or more input devices 1226; one or more output devices 1228; one or more input devices 1232; and one or more output devices 1234.

The vehicle computing system 1212 can include the one or more computing devices 1214. The one or more computing devices 1214 can include one or more processors 1218 which can be included on-board a vehicle including the vehicle 108 and one or more memory devices 1220 which can be included on-board a vehicle including the vehicle 108. The one or more processors 1218 can include any processing device including a microprocessor, microcontroller, integrated circuit, an application specific integrated circuit (ASIC), a digital signal processor (DSP), a field-programmable gate array (FPGA), logic device, one or more central processing units (CPUs), graphics processing units (GPUs), and/or processing units performing other specialized calculations. The one or more processors 1218 can include a single processor or a plurality of processors that are operatively and/or selectively connected. The one or more memory devices 1220 can include one or more non-transitory computer-readable storage media, such as RAM, ROM, EEPROM, EPROM, flash memory devices, magnetic disks, and/or combinations thereof.

The one or more memory devices 1220 can store data or information that can be accessed by the one or more processors 1218. For instance, the one or more memory devices 1220 which can be included on-board a vehicle including the vehicle 108, can include a memory system 1222 that can store computer-readable instructions that can be executed by the one or more processors 1218. The memory system 1222 can include software written in any programming language that can be implemented in hardware (e.g., computing hardware). Further, the memory system 1222 can include instructions that can be executed in logically and/or virtually separate threads on the one or more processors 1218. The memory system 1222 can include any set of instructions that when executed by the one or more processors 1218 cause the one or more processors 1218 to perform operations.

For example, the one or more memory devices 1220 which can be included on-board a vehicle (e.g., the vehicle 108) can store instructions, including specialized instructions, that when executed by the one or more processors 1218 on-board the vehicle cause the one or more processors 1218 to perform operations such as any of the operations and functions of the one or more computing devices 1214 or for which the one or more computing devices 1214 are configured, including any of the operations performed by the vehicle computing system 112 and/or any other operations and/or functions for operation of a vehicle, as described in the present disclosure.

The one or more memory devices 1220 can include a memory system 1224 that can store data that can be retrieved, manipulated, created, and/or stored by the one or more computing devices 1214. The data stored in memory system 1224 can include, for instance, the sensor data and/or training data that are described herein including in the methods 700-1000 that are depicted in FIGS. 7-10 respectively. Furthermore, the data stored in the memory system 1224 can include one or more machine-learned models that have been configured and/or trained to generate an output based at least in part on an input provided to the one or more machine-learned models. For example, the one or more machine-learned models stored in the memory system 1224 can include one or more convolutional neural networks, one or more residual convolutional neural networks, one or more recurrent neural networks, and/or one or more recursive neural networks. Further, the one or more machine-learned models stored in the memory system 1224 can include one or more machine-learned segmentation models, which are described herein including in the methods 700-1000 that are depicted in FIGS. 7-10.

The data that is stored in the memory system 1224 can also include data associated with one or more states of one or more objects detected by one or more sensors (e.g., the one or more sensors 114 of the vehicle 108 that is described in the method 100 that is depicted in FIG. 1); data associated with one or more states of a device associated with the operations and/or functions of the vehicle computing system 1212, the operations computing system 1204, and/or the one or more remote computing devices 1206; data generated by any of the computing systems (e.g., the vehicle computing system 112) and/or computing devices involved in the determination of semantic segments as described herein; data associated with user input; data associated with one or more actions and/or control command signals; data associated with users; and/or other data or information. The data in the memory system 1224 can be stored in one or more databases. The one or more databases can be split up so that the one or more databases are located in multiple locales on-board a vehicle which can include the vehicle 108. In some implementations, the one or more computing devices 1214 can obtain data from one or more memory devices that are remote from a vehicle, including, for example the vehicle 108.

The system 1200 can include the network 1202 (e.g., a communications network) which can be used to send and/or receive signals (e.g., electronic signals) or data (e.g., data from a computing device) including signals or data exchanged between computing devices including the operations computing system 1204, the one or more remote computing devices 1206, and/or the vehicle computing system 1212. The network 1202 can include any combination of various wired (e.g., twisted pair cable) and/or wireless communication mechanisms (e.g., cellular, wireless, satellite, microwave, and radio frequency) and/or any desired network topology (or topologies). For example, the communications network 1202 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from a vehicle including the vehicle 108.

The one or more computing devices 1214 can also include the communication interface 1216 used to communicate with one or more other systems which can be included on-board a vehicle including the vehicle 108 (e.g., over the network 1202). The communication interface 1216 can include any suitable components for interfacing with one or more networks, including for example, transmitters, receivers, ports, controllers, antennas, other hardware and/or software.

The vehicle computing system 1212 can also include one or more input devices 1226 and/or one or more output devices 1228. The one or more input devices 1226 and/or the one or more output devices 1228 can be included and/or otherwise associated with a human-machine interface system. The one or more input devices 1226 can include, for example, hardware for receiving information from a user, such as a touch screen, touch pad, mouse, data entry keys, speakers, and/or a microphone suitable for voice recognition. The one or more output devices 1228 can include one or more display devices (e.g., display screen, CRT, LCD) and/or one or more audio output devices (e.g., loudspeakers). The display devices and/or the audio output devices can be used to facilitate communication with a user. For example, a human operator (e.g., associated with a service provider) can communicate with a current user of a vehicle including the vehicle 108 via at least one of the display devices and the audio output devices.

The operations computing system 1204 can include one or more computing devices configured to perform one or more operations associated with operating one or more services. The one or more services can include one or more transportation services, courier services, and/or delivery services. Furthermore, the operations computing system 1204 can include one or more processors and one or more memory devices that can be used to store data including the sensor data, the training data, and/or the one or more machine-learned models that are stored in the memory system 1224.

The one or more remote computing devices 1206 can include various types of computing devices. For example, the one or more remote computing devices 1206 can include a phone, a smart phone, a tablet, a personal digital assistant (PDA), a laptop computer, a computerized watch (e.g., a smart watch), computerized eyewear, computerized headwear, other types of wearable computing devices, a gaming system, a media player, an e-book reader, and/or other types of computing devices. The one or more remote computing devices 1206 can be associated with a user. The one or more remote computing devices 1206 described herein can also be representative of a user device that can be included in the human machine interface system of a vehicle including the vehicle 108.

The one or more remote computing devices 1206 can include one or more input devices 1232 and/or one or more output devices 1234. The one or more input devices 1232 can include, for example, hardware for receiving information from a user, such as a touch screen, touch pad, mouse, data entry keys, speakers, and/or a microphone suitable for voice recognition. The one or more output devices 1234 can include hardware for providing content for display. For example, the one or more output devices 1234 can include a display device (e.g., a display including CRT, LCD, and/or OLED), which can include hardware for a user interface.

Furthermore, the one or more remote computing devices 1206 can include one or more processors and one or more memory devices which can be used to store data including the sensor data, the training data, and/or the one or more machine-learned models that are stored in the memory system 1224.

The technology discussed herein makes reference to computing devices, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, computer-implemented processes discussed herein can be implemented using a single computing device or multiple computing devices working in combination. Databases and applications can be implemented on a single system or distributed across multiple systems. Distributed components can operate sequentially or in parallel.

Furthermore, computing tasks discussed herein as being performed at computing devices remote from the vehicle (e.g., the operations computing system and its associated computing devices) can instead be performed at the vehicle (e.g., via the vehicle computing system). Such configurations can be implemented without deviating from the scope of the present disclosure.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of sensor output segmentation, the computer-implemented method comprising:
   accessing sensor data comprising a plurality of sensor data returns representative of an environment detected by at least one sensor across a field of view of the at least one sensor;
   associating the plurality of sensor data returns with a plurality of bins corresponding to the field of view of the at least one sensor, wherein the plurality of bins respectively correspond to a different angular portion associated with a number of degrees of the field of view of the at least one sensor;
   for a bin of the plurality of bins that contains multiple sensor data returns respectively indicating objects at multiple different distances, selecting a sensor data return of the multiple sensor data returns in the bin, the selected sensor data return being characterized by a minimum distance of the multiple different distances;
   generating a plurality of channels for the plurality of bins, the plurality of channels respectively comprising data indicative of a range and an azimuth associated with at least one sensor data return associated with a respective bin of the plurality of bins, and wherein the plurality of channels further comprises data indicative of a signal to noise ratio associated with the sensor data of respective bins of the plurality of bins; and generating a semantic segment of at least a portion of the sensor data representative of the environment by inputting the plurality of channels into a machine-learned segmentation model trained to segment at least a portion of the plurality of sensor data returns based at least in part on input comprising the plurality of channels, wherein the machine-learned segmentation model generates at least one output comprising the semantic segment.

2. The computer-implemented method of claim 1, wherein the at least one sensor comprises a radar device, and further comprising:

generating one or more sensor detection outputs comprising information associated with the semantic segment, wherein the semantic segment comprises one or more foreground segments.

3. The computer-implemented method of claim 2, wherein the plurality of channels further comprise data indicative of an ego-motion compensated velocity or whether an object was detected.

4. The computer-implemented method of claim 1, wherein the plurality of channels further comprise a feature vector, and wherein the feature vector comprises a plurality of features.

5. The computer-implemented method of claim 1, wherein the plurality of sensor data returns comprise a plurality of two-dimensional sensor data returns, and wherein associating the plurality of sensor data returns with the plurality of bins corresponding to the field of view of the at least one sensor further comprises:

rasterizing at least a portion of the plurality of two-dimensional sensor data returns into a single dimension.

6. The computer-implemented method of claim 5, further comprising:

for the plurality of bins, selecting a two-dimensional sensor data return having a minimum distance relative to the at least one sensor.

7. The computer-implemented method of claim 6, wherein rasterizing at least a portion of the plurality of two-dimensional sensor data returns into a single dimension comprises:

discarding the two-dimensional sensor data returns that were not selected from the plurality of bins; and
generating a rasterized data output indicative of a plurality of selected two-dimensional sensor data returns from the plurality of bins.

8. The computer-implemented method of claim 7, wherein the at least one sensor data return associated with the respective bin of the plurality of bins comprises a single sensor data return comprising the two-dimensional sensor data return having the minimum distance relative to the at least one sensor.

9. The computer-implemented method of claim 1, wherein the plurality of sensor data returns are respectively associated with one or more detections by the at least one sensor in the different portions of the field of view.

10. The computer-implemented method of claim 1, wherein the machine-learned segmentation model is iteratively trained, and wherein iteratively training the machine-learned segmentation model comprises:

accessing training data comprising a plurality of training feature vectors respectively associated with a plurality of training representations and one or more features of the plurality of training representations;

determining one or more training foreground segments of the plurality of training representations based at least in part on the plurality of training feature vectors and the machine-learned segmentation model;

determining a loss based at least in part on one or more comparisons of the one or more training foreground segments of the plurality of training representations to one or more ground-truth foreground segments; and adjusting one or more parameters of the machine-learned segmentation model based at least in part on the loss.

11. The computer-implemented method of claim 10, wherein the determining the loss based at least in part on one or more comparisons of the one or more training foreground segments of the plurality of training representations to one or more ground-truth foreground segments comprises:

determining the loss based at least in part on an accuracy of the one or more training foreground segments of the plurality of training representations, wherein the accuracy is positively correlated with a proportion of the one or more training foreground segments that correspond to the one or more ground-truth foreground segments, and wherein the loss is inversely correlated with the accuracy.

12. The computer-implemented method of claim 1, wherein the plurality of channels respectively correspond to the sensor data return that is closest to the at least one sensor and is associated with the respective bin of the plurality of bins.

13. The computer-implemented method of claim 1, wherein the at least one sensor comprises one or more light detection and ranging (LiDAR) devices, and wherein the plurality of channels comprise data indicative of an intensity associated with a return strength of a plurality of pulses generated by the one or more LiDAR devices.

14. The computer-implemented method of claim 1, further comprising:

accessing map data comprising information associated with one or more portions of the environment that are classified as foreground or background; and determining that the plurality of sensor data returns are associated with the one or more portions of the environment that are classified as foreground.

15. The computer-implemented method of claim 1, wherein the at least one sensor comprises a plurality of sensors that detect different subsets of the field of view, and wherein the field of view of the at least one sensor comprises a plurality of different portions, and wherein the different portions of the field of view detected by the plurality of sensors overlap.

16. A computing system comprising:
one or more processors;
a memory comprising one or more computer-readable media, the memory storing computer-readable instructions that when executed by the one or more processors cause the one or more processors to perform operations comprising:

accessing sensor data associated with radar output of at least one radar device that detects one or more distances and angles of one or more objects relative to the at least one radar device across a field of view of the at least one radar device;

respectively associating a plurality of radar points from the sensor data with a plurality of different angular portions associated with a number of degrees of the field of view of the at least one radar device;

for a given angular portion of the plurality of different angular portions that has multiple radar points respectively indicating objects at multiple different distances, selecting one or more radar points of the multiple radar points for the given angular portion, the selected one or more radar points return being characterized by a minimum distance of the multiple different distances;

generating a plurality of channels for the plurality of different angular portions of the field of view of the at least one radar device, the plurality of channels including data indicative of one or more features of at least one radar point associated with the respective portions of the field of view, and wherein the plurality of channels further comprises data indicative of a signal to noise ratio of the sensor data associated with the respective portions of the field of view;

determining one or more foreground segments of the sensor data based at least in part on the plurality of channels and a machine-learned segmentation model trained to segment the plurality of radar points based at least in part on input comprising the plurality of channels for the respective portions of the field of view; and generating sensor detection output comprising information associated with the one or more foreground segments.

17. The computing system of claim 16, the operations further comprising controlling motion of an autonomous vehicle based at least in part on the sensor detection output.

18. The computing system of claim 16, wherein the plurality of radar points comprises two-dimensional data, and wherein the computing system performs operations further comprising:

generating a rasterized data output indicative of at least a portion of the plurality of radar points, wherein the rasterized data output comprises one-dimensional data.

19. An autonomous vehicle comprising:
one or more processors;
a memory comprising one or more computer-readable media, the memory storing computer-readable instructions that when executed by the one or more processors cause the one or more processors to perform operations comprising:
  accessing sensor data comprising a plurality of sensor data returns representative of an environment detected by at least one sensor across a field of view of the at least one sensor;
  associating the plurality of sensor data returns with a plurality of bins corresponding to the field of view of the at least one sensor, wherein the plurality of bins respectively correspond to a different angular portion associated with a number of degrees of the field of view of the at least one sensor;
  for a bin of the plurality of bins that contains multiple sensor data returns respectively indicating objects at multiple different distances, selecting a sensor data return of the multiple sensor data returns in the bin, the selected sensor data return being characterized by a minimum distance of the multiple different distances;
  generating a plurality of channels for the plurality of bins, the plurality of channels respectively comprising data indicative of a range and an azimuth associated with at least one sensor data return associated with a respective bin of the plurality of bins, and wherein the plurality of channels further comprises data indicative of a signal to noise ratio associated with the sensor data of respective bins of the plurality of bins; and
  generating a semantic segment of at least a portion of the sensor data representative of the environment by inputting the plurality of channels into a machine-learned segmentation model trained to segment at least a portion of the plurality of sensor data returns based at least in part on input comprising the plurality of channels, wherein the machine-learned segmentation model generates at least one output comprising the semantic segment.

20. The autonomous vehicle of claim 19, wherein the field of view comprises a three-hundred and sixty degree field of view around the autonomous vehicle, and further comprising:
sending the at least one output to a perception system of the autonomous vehicle, wherein the perception system is configured to use the at least one output to determine one or more locations of one or more objects in the environment; and
controlling one or more autonomous vehicle systems of the autonomous vehicle based at least in part on the at least one output, wherein the one or more autonomous vehicle systems comprise one or more engine systems, one or more motor systems, one or more steering systems, one or more braking systems, one or more electrical systems, or one or more communications systems.

* * * * *